United States Patent
Bakalash et al.

(10) Patent No.: US 6,385,604 B1
(45) Date of Patent: May 7, 2002

(54) RELATIONAL DATABASE MANAGEMENT SYSTEM HAVING INTEGRATED NON-RELATIONAL MULTI-DIMENSIONAL DATA STORE OF AGGREGATED DATA ELEMENTS

(75) Inventors: Reuven Bakalash, Shdema; Guy Shaked, Beer Sheva; Joseph Caspi, Herzlyia, all of (IL)

(73) Assignee: Hyperroll, Israel Limited, Rehovot (IL)

( * ) Notice: Subject to any disclaimer, the term of this patent is extended or adjusted under 35 U.S.C. 154(b) by 0 days.

(21) Appl. No.: 09/634,748

(22) Filed: Aug. 9, 2000

Related U.S. Application Data

(63) Continuation-in-part of application No. 09/514,611, filed on Feb. 28, 2000, which is a continuation-in-part of application No. 09/368,241, filed on Aug. 4, 1999.

(51) Int. Cl.[7] ............................................... G06F 17/30
(52) U.S. Cl. .............................. 707/3; 707/10; 709/217
(58) Field of Search ........................ 707/1–5, 100–104; 709/201, 217–219

(56) References Cited

U.S. PATENT DOCUMENTS

| | | | |
|---|---|---|---|
| 5,257,365 A | 10/1993 | Powers et al. | 707/100 |
| 5,379,419 A | 1/1995 | Heffernan et al. | 707/4 |
| 5,745,764 A | 4/1998 | Leach et al. | 709/316 |
| 5,781,896 A | 7/1998 | Dalal | 707/2 |
| 5,799,300 A | 8/1998 | Agrawal et al. | 707/5 |
| 5,805,885 A | 9/1998 | Leach et al. | 709/316 |
| 5,822,751 A | 10/1998 | Gray et al. | 707/3 |
| 5,832,475 A | 11/1998 | Agrawal et al. | 707/2 |
| 5,850,547 A | 12/1998 | Waddington et al. | 709/102 |
| 5,857,184 A | 1/1999 | Lynch | 707/4 |
| 5,864,857 A | 1/1999 | Ohata et al. | 707/100 |
| 5,890,151 A | 3/1999 | Agrawal et al. | 707/5 |
| 5,926,820 A | 7/1999 | Agrawal et al. | 707/200 |
| 5,978,788 A | 11/1999 | Castellli et al. | 707/2 |
| 5,987,467 A | 11/1999 | Ross et al. | 707/100 |
| 5,991,754 A | 11/1999 | Raitto et al. | 707/2 |
| 6,003,029 A | 12/1999 | Agrawal et al. | 707/7 |
| 6,023,695 A | 2/2000 | Osborn et al. | 707/3 |
| 6,108,647 A | 8/2000 | Poosala et al. | 707/1 |
| 6,141,655 A | 10/2000 | Johnson et al. | 707/2 |
| 6,151,601 A | 11/2000 | Papiernak et al. | 707/10 |
| 6,161,103 A | 12/2000 | Rauer et al. | 707/4 |
| 6,173,310 B1 | 1/2001 | Yost et al. | 709/201 |
| 6,182,060 B1 | 1/2001 | Hedgcock et al. | 707/1 |
| 6,324,533 B1 * | 11/2001 | Agrawal et al. | 707/3 |

OTHER PUBLICATIONS

Albrecht, J. and Sporer, W. "Aggregate–based Query Processing in a Parallel Data Warehouse Server", Proceedings of the Tenth International Workshop on Database and Expert Systems Applications, Sep. 1–3, 1999, pp. 40–44.

(List continued on next page.)

Primary Examiner—Jean R. Homere
Assistant Examiner—Luke S Wassum
(74) Attorney, Agent, or Firm—Thomas J. Perkowski, Esq., P.C.

(57) ABSTRACT

Improved method of and apparatus for joining and aggregating data elements integrated within a relational database management system (RDBMS) using a non-relational multi-dimensional data structure (MDD). The improved RDBMS system of the present invention can be used to realize achieving a significant increase in system performance (e.g. [deceased] decreased access/search time), user flexibility and ease of use. The improved RDBMS system of the present invention can be used to realize an improved Data Warehouse for supporting on-line analytical processing (OLAP) operations or to realize an improved informational database system or the like.

27 Claims, 25 Drawing Sheets

OTHER PUBLICATIONS

Harinarayan, V. et al. "Implementing Data Cubes Efficiently", Proceedings of the 1996 ACM SIGMOD International Conference on Management of Data, Jun. 4–6, 1996, pp. 205–216.

Introduction To Structured Query Language, http://w3.one.net/~jhoffmann/sqltut.htm, 2000, p. 1–33.

An Introduction to Database Systems by C.J. Date, Addison–Wesley, No. 7th, 2000, p. p. 250,266,289–326.

Abstract and Chapter 4 of Aspects of Data Modeling and Query Processing for Com by Torben Bach Pedersen, Dept. Computer Sci., Aalborg Univ., Denmark, 2000, p. 1,77–103.

Characterization of Hierarchies and Some Operators in OLAP Environment by E. Pourabbas, et. al., ACM 2nd Int'l Workshop on Data Warehousing & OLAP, 1999, p. 54–59.

The Art of Indexing by not indicated, Dynamic Information Systems Corporation, 1999, p. 3–30.

Relational Database Design Clearly Explained by Jan L. Harrington, Morgan Kaufman, 1998, p. v–xiii, 1–62.

Expanded Version of "Modeling Multidimensional Databases" by R. Agrawal, et. al., Proc. of 13th Int'l Conf. on Data Engineering, pp. 1–23, available as Research Report 1995.

A Data Model for Supporting On–Line Analytical Processing by C. Li and X.S. Wang, Proceedings of Int'l Conf. on Info & Knowledge Mgmt., 1996, p. 81–88.

On the Computation of Multidimensional Aggregates by S. Agarwal, et. al., 22nd Int'l Conf. on Very Large Databases, 1996, p. 1–16.

Aggregate Navigation With (Almost) No MetaData by Ralph Kimball, http://www.dbmsmag.com/9608d54.html, 1996, p. 1–8.

Optimizing Statistical Queries by Exploiting Orthogonality and Interval Properti by C. Li and X. Wang, 8th International Conf. on Scientific & Statistical Database Management, 1996, p. 1–10.

Implementing Data Cubes Efficiently by Venky Harinarayan, et. al., Proceedings of the 1996 ACM SIGMOD 1996, p. 1–25.

* cited by examiner

CELLAR

| Wine | Year | Bottles |
|---|---|---|
| Chardonnay | 1996 | 4 |
| Fume Blanc | 1996 | 2 |
| Pinot Noir | 1993 | 3 |
| Zinfandel | 1994 | 9 |

FIG. 3A

Restrict operator:

SELECT WINE, YEAR, BOTTLES
FROM CELLAR
WHERE YEAR > 1995 ;

Result:

| Wine | Year | Bottles |
|---|---|---|
| Chardonnay | 1996 | 4 |
| Fume Blanc | 1996 | 2 |

FIG. 3B

Project operator:

SELECT WINE, BOTTLES
FROM CELLAR;

Result:

| Wine | Bottles |
|---|---|
| Chardonnay | 4 |
| Fume Blanc | 2 |
| Pinot Noir | 3 |
| Zinfandel | 9 |

FIG. 3C

TP
Time period
Dimension table

| TP# | FROM | TO |
|---|---|---|
| TP1 | ta | tb |
| TP2 | tc | td |
| TP3 | te | tf |
| TP4 | tg | th |
| TP5 | ti | tj |

SP
Fact table

| S# | P# | TP# | QTY |
|---|---|---|---|
| S1 | P1 | TP3 | 300 |
| S1 | P1 | TP5 | 100 |
| S1 | P2 | TP1 | 200 |
| S1 | P3 | TP2 | 400 |
| S1 | P4 | TP1 | 200 |
| S1 | P5 | TP5 | 100 |
| S1 | P6 | TP4 | 200 |
| S2 | P1 | TP3 | 300 |
| S2 | P2 | TP4 | 400 |
| S3 | P2 | TP1 | 300 |
| S3 | P2 | TP3 | 200 |

FIG. 4B

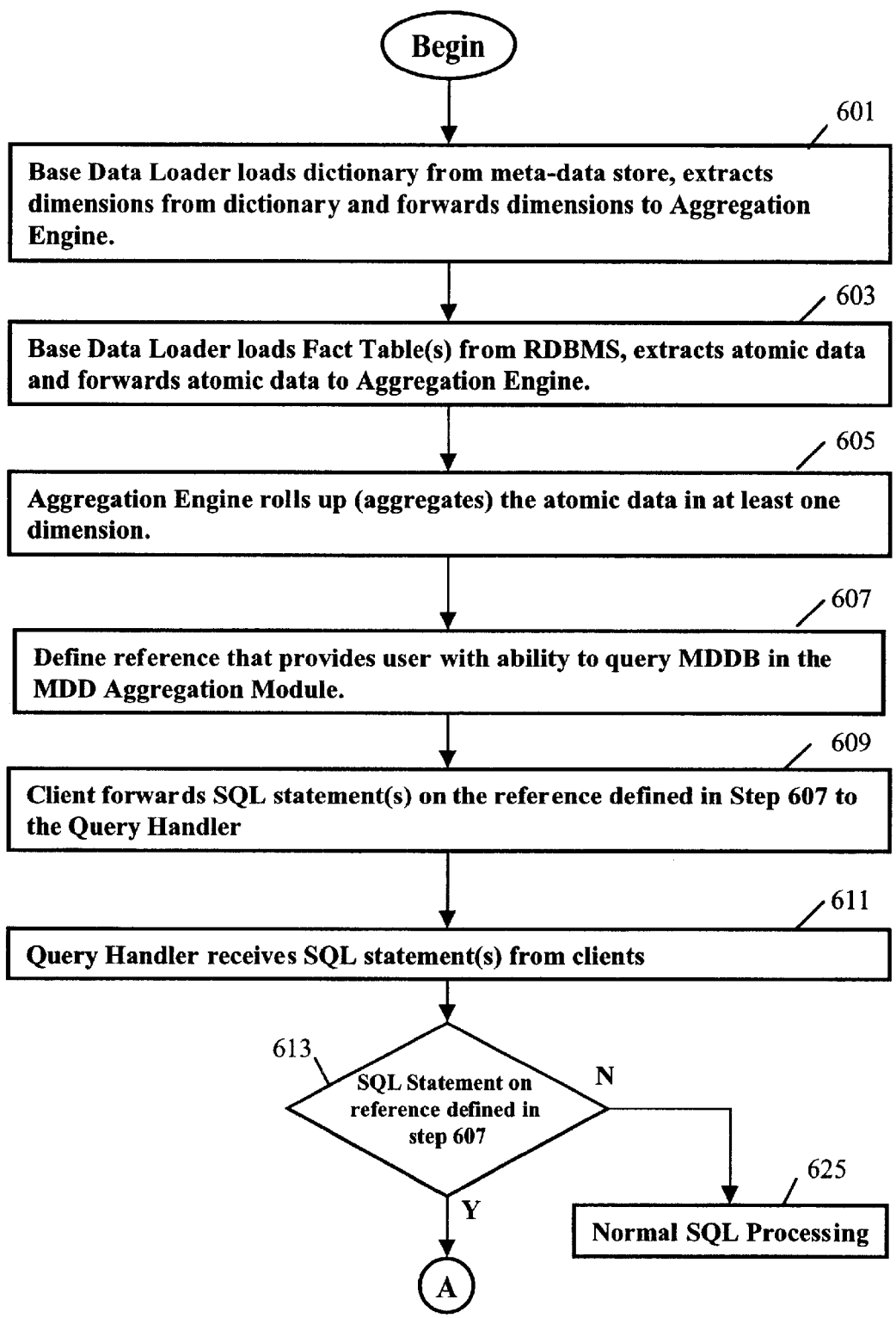
FIG. 6C1

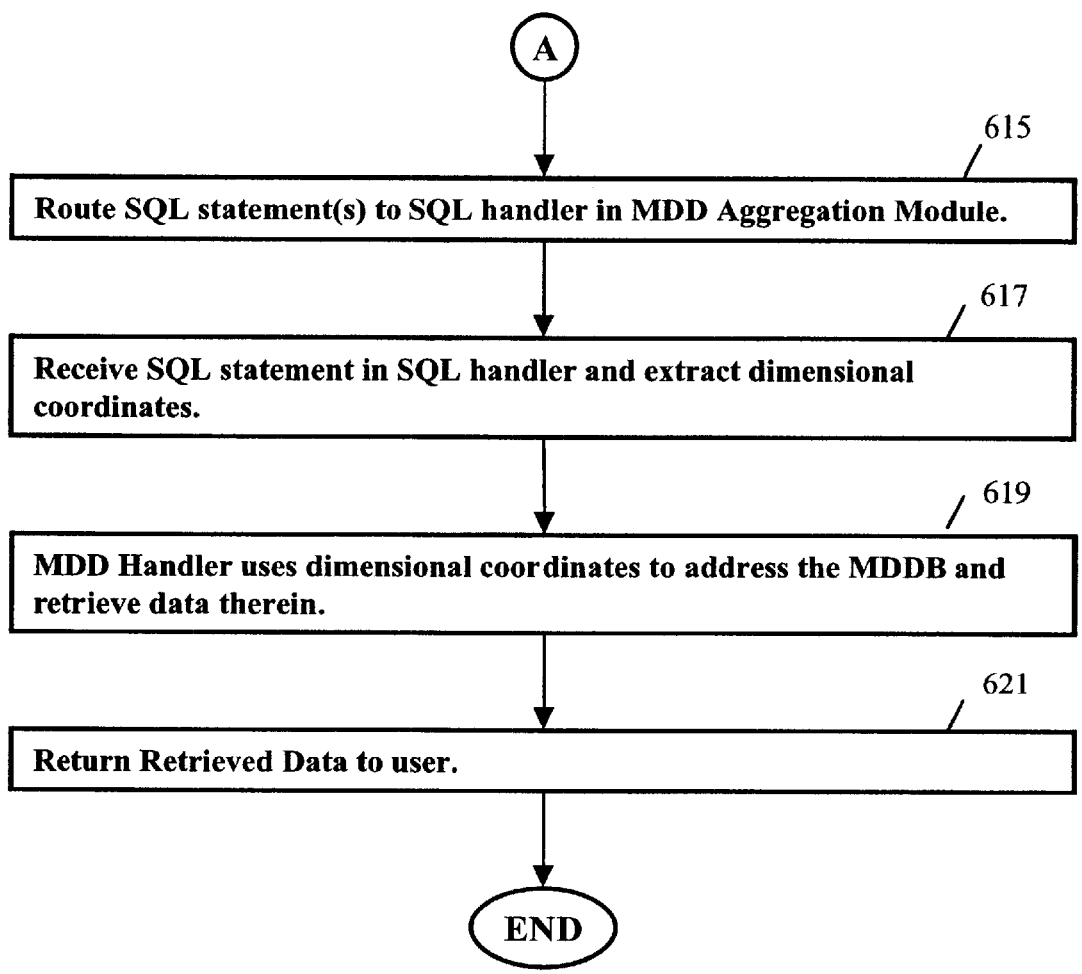
FIG 6C2

|  | Nbr. of Dim. | Nbr. of atomic data values | Leaf node density % | Number of values in cube after roll-up | Oracle EXPRESS v. 6.2 | Implementation of current invention |
|---|---|---|---|---|---|---|
| D1 | 6 | 302 M | 9 | 427 M | 16 h | 15 m |
| D2 | 4 | 414 M | 1.27 | 969 M | 50 m | 5 m |
| D3 | 5 | 14,499 M | 0.03 | 63,954 M | 31 h | 1h 23m |
| D4 | 6 | 623,494 M | $8*10^{-4}$ | 7,930 M | Exceeds 48 h | 2h 20m |
| D5 | 6 | 243,000 G | $10^{-8}$ | 1,160,000 G | 22 h | 4 m |
| D6 | 4 | 7 M | defined as 100 | 19 M | 15 m | 1 m |

FIG. 8A

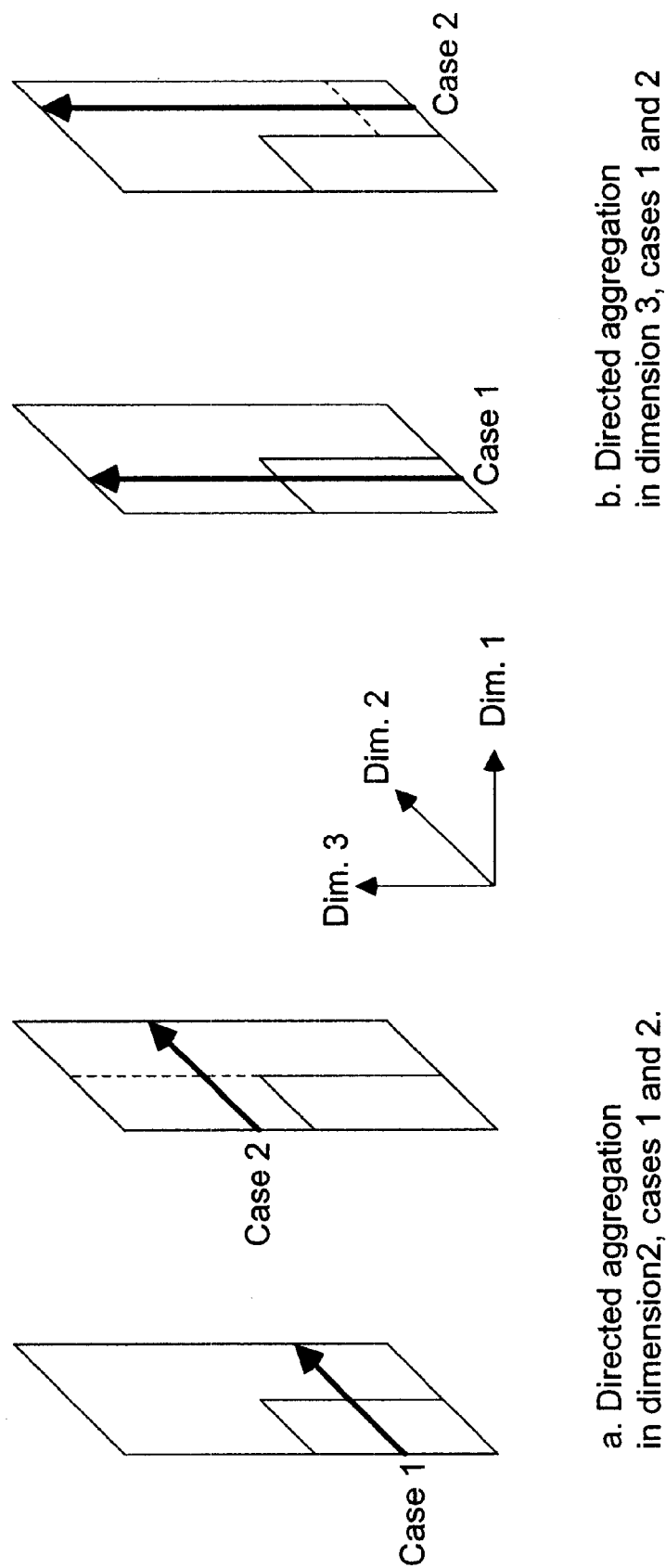

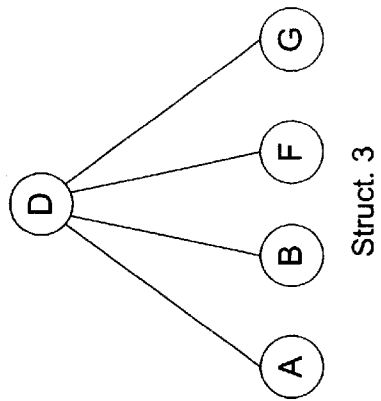
Struct. 3
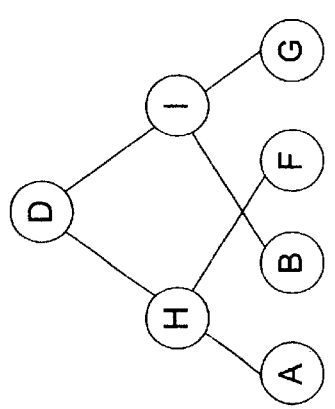
Struct. 2
FIG. 11A
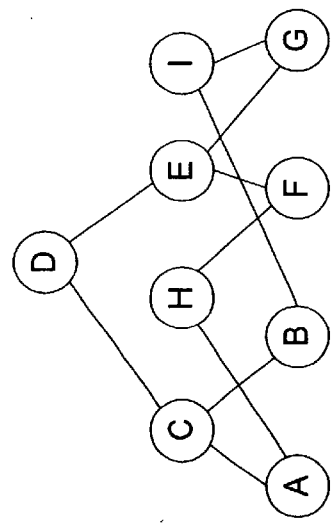
FIG. 11B
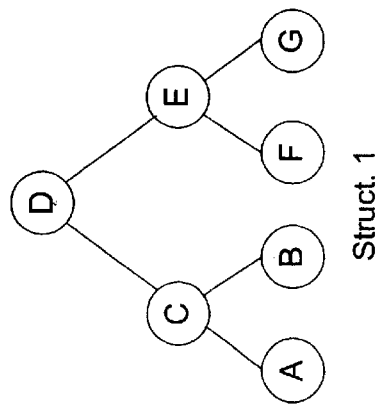
Struct. 1

RELATIONAL DATABASE MANAGEMENT SYSTEM HAVING INTEGRATED NON-RELATIONAL MULTI-DIMENSIONAL DATA STORE OF AGGREGATED DATA ELEMENTS

RELATED CASES

This is a Continuation-in-part of: copending application Ser. No. 09/514,611 entitled "Stand-Alone Cartridge-Style Data Aggregation Server and Method of and System for Managing Multi-Dimensional Databases using the Same" filed Feb. 28, 2000, and copending application Ser. No. 09/368,241 entitled "Method Of And System For Managing Multi-Dimensional Databases Using Modular-Arithmetic Based Address Data Mapping Processes" filed Aug. 4, 1999; said Applications being commonly owned by HyperRoll Israel, Limited, herein incorporated by reference in their entirety.

BACKGROUND OF THE INVENTION

1. Field of Invention

The present invention relates generally to multi-dimensional relational databases and, more specifically to mechanisms for aggregating data elements in a multi-dimensional relational database system and for processing queries on such aggregated data elements, and also to informational database systems that utilize multi-dimensional relational databases and such aggregation/query mechanisms.

2. Brief Description of the State of the Art

Information technology (IT) enables an enterprise to manage and optimize its internal business practices through the analysis and sharing of data internally within the enterprise. In addition, IT enables an enterprise to manage and optimize its external business practices through the sharing of data with external parties such as suppliers, customers and investors, and through on-line transactions between the enterprise and external parties. Informational database systems (systems that store data, support query processing on the stored data, and possibly support analysis of the stored data) play a central role in many different parts of today's IT systems.

FIG. 1 illustrates exemplary domains where informational database systems are used. As shown, an operational environment 10 generates data which is stored in a data store 22 in the informational database system 20. These domains include data analysis systems (spread-sheet modeling programs, snap-shots, extraction, denormalization), data warehousing, data marts, OLAP systems, data mining systems, electronic commerce-enabled web servers, and business-to-business exchanges. Modern informational database systems typically use a relational database management system (RDBMS) as a repository for storing the data and querying the data.

FIG. 2 illustrates a data warehouse-OLAP domain that utilizes the prior art approaches described above. The data warehouse is an enterprise-wide data store. It is becoming an integral part of many information delivery systems because it provides a single, central location where a reconciled version of data extracted from a wide variety of operational systems is stored. Details on methods of data integration and constructing data warehouses can be found in the white paper entitled "Data Integration: The Warehouse Foundation" by Louis Rollleigh and Joe Thomas, published at http://www.acxiom.com/whitepapers/wp-11.asp. Building a Data Warehouse has its own special challenges (e.g. using common data model, common business dictionary, etc.) and is a complex endeavor. However, just having a Data Warehouse does not provide organizations with the often-heralded business benefits of data warehousing. To complete the supply chain from transactional systems to decision maker, organizations need to deliver systems that allow knowledge workers to make strategic and tactical decisions based on the information stored in these warehouses. These decision support systems are referred to as On-Line Analytical Processing (OLAP) systems. Such OLAP systems are commonly classified as Relation OLAP systems or Multi-Dimensional OLAP systems.

The Relational OLAP (ROLAP) system accesses data stored in a Data Warehouse to provide OLAP analyses. The premise of ROLAP is that OLAP capabilities are best provided directly against the relational database, i.e. the Data Warehouse. The ROLAP architecture was invented to enable direct access of data from Data Warehouses, and therefore support optimization techniques to meet batch window requirements and provide fast response times. Typically, these optimization techniques include application-level table partitioning, pre-aggregate inferencing, denormalization support, and the joining of multiple fact tables.

A typical ROLAP system has a three-tier or layer client/server architecture. The "database layer" utilizes relational databases for data storage, access, and retrieval processes. The "application logic layer" is the ROLAP engine which executes the multidimensional reports from multiple users. The ROLAP engine integrates with a variety of "presentation layers," through which users perform OLAP analyses. After the data model for the data warehouse is defined, data from on-line transaction-processing (OLTP) systems is loaded into the relational database management system (RDBMS). If required by the data model, database routines are run to pre-aggregate the data within the RDBMS. Indices are then created to optimize query access times. End users submit multidimensional analyses to the ROLAP engine, which then dynamically transforms the requests into SQL execution plans. The SQL execution plans are submitted to the relational database for processing, the relational query results are cross-tabulated, and a multidimensional result data set is returned to the end user. ROLAP is a fully dynamic architecture capable of utilizing pre-calculated results when they are available, or dynamically generating results from the raw information when necessary.

The Multidimensional OLAP (MOLAP) systems utilize a MDD or "cube" to provide OLAP analyses. The main premise of this architecture is that data must be stored multidimensionally to be accessed and viewed multidimensionally. Such non-relational MDD data structures typically can be queried by users to enable the users to "slice and dice" the aggregated data. As shown in FIG. 2, such MOLAP systems have an Aggregation module which is responsible for all data storage, access, and retrieval processes, including data aggregation (i.e. pre-aggregation) in the MDDB, and an analytical processing and GUI module responsible for interfacing with a user to provide analytical analysis, query input, and reporting of query results to the user.

A more detailed description of the data warehouse and OLAP environment may be found in copending U.S. patent application No. 09/514,611 to R. Bakalash, G. Shaked, and J. Caspi, commonly assigned to HyperRoll Israel, Limited, incorporated by reference above in its entirety.

In a RDBMS, users view data stored in tables. By contrast, users of a non-relation database system can view other data structures, either instead of or in addition to the tables of the RDBMS system. FIG. 3A illustrates an exemplary table in an RDBMS; and FIGS. 3B and 3C illustrate operators (queries) on the table of FIG. 3A, and the result of such queries, respectively. The operators illustrated in FIGS. 3B and 3C are expressed as Structured Query Language (SQL) statements as is conventional in the art.

The choice of using a RDBMS as the data repository in information database systems naturally stems from the realities of SQL standardization, the wealth of RDBMS-related tools, and readily available expertise in RDBMS systems. However, the querying component of RDBMS technology suffers from performance and optimization problems stemming from the very nature of the relational data model. More specifically, during query processing, the relational data model requires a mechanism that locates the raw data elements that match the query. Moreover, to support queries that involve aggregation operations, such aggregation operations must be performed over the raw data elements that match the query. For large multi-dimensional databases, a naive implementation of these operations involves computational intensive table scans that leads to unacceptable query response times.

In order to better understand how the prior art has approached this problem, it will be helpful to briefly describe the relational database model. According to the relational database model, a relational database is represented by a logical schema and tables that implement the schema. The logical schema is represented by a set of templates that define one or more dimensions (entities) and attributes associated with a given dimension. The attributes associated with a given dimension includes one or more attributes that distinguish it from every other dimension in the database (a dimension identifier). Relationships amongst dimensions are formed by joining attributes. The data structure that represents the set of templates and relations of the logical schema is typically referred to as a catalog or dictionary. Note that the logical schema represents the relational organization of the database, but does not hold any fact data per se. This fact data is stored in tables that implement the logical schema.

Star schemas are frequently used to represent the logical structure of a relational database. The basic premise of star schemas is that information can be classified into two groups: facts and dimensions. Facts are the core data elements being analyzed. For example, units of individual item sold are facts, while dimensions are attributes about the facts. For example, dimensions are the product types purchased and the data purchase. Business questions against this schema are asked looking up specific facts (UNITS) through a set of dimensions (MARKETS, PRODUCTS, PERIOD). The central fact table is typically much larger than any of its dimension tables.

An exemplary star schema is illustrated in FIG. 4A for suppliers (the "Supplier" dimension) and parts (the "Parts" dimension) over time periods (the "Time-Period" dimension). It includes a central fact table "Supplied-Parts" that relates to multiple dimensions—the "Supplier", "Parts" and "Time-Period" dimensions. FIG. 4B illustrates the tables used to implement the star schema of FIG. 4A. More specifically, these tables include a central fact table and a dimension table for each dimension in the logical schema of FIG. 4A. A given dimension table stores rows (instances) of the dimension defined in the logical schema. For the sake of description, FIG. 4B illustrates the dimension table for the "Time-Period" dimension only. Similar dimension tables for the "Supplier" and "Part" dimensions (not shown) are also included in such an implementation. Each row within the central fact table includes a multi-part key associated with a set of facts (in this example, a number representing a quantity). The multi-part key of a given row (values stored in the S#,P#,TP# fields as shown) points to rows (instances) stored in the dimension tables described above. A more detailed description of star schemas and the tables used to implement star schemas may be found in C. J. Date, "An Introduction to Database Systems," Seventh Edition, Addison-Wesley, 2000, pp. 711–715, herein incorporated by reference in its entirety.

When processing a query, the tables that implement the schema are accessed to retrieve the facts that match the query. For example, in a star schema implementation as described above, the facts are retrieved from the central fact table and/or the dimension tables. Locating the facts that match a given query involves one or more join operations. Moreover, to support queries that involve aggregation operations, such aggregation operations must be performed over the facts that match the query. For large multi-dimensional databases, a naive implementation of these operations involves computational intensive table scans that typically leads to unacceptable query response times. Moreover, since the fact tables are pre-summarized and aggregated along business dimensions, these tables tend to be very large. This point becomes an important consideration of the performance issues associated with star schemas. A more detailed discussion of the performance issues (and proposed approaches that address such issues) related to joining and aggregation of star schema is now set forth.

The first performance issue arises from computationally intensive table scans that are performed by a naive implementation of data joining. Indexing schemes may be used to bypass these scans when performing joining operations. Such schemes include B-tree indexing, inverted list indexing and aggregate indexing. A more detailed description of such indexing schemes can be found in "The Art of Indexing", Dynamic Information Systems Corporation, October 1999, available at http://www.disc.com/artindex.pdf. All of these indexing schemes replaces table scan operations (involved in locating the data elements that match a query) with one ore more index lookup operation. Inverted list indexing associates an index with a group of data elements, and stores (at a location identified by the index) a group of pointers to the associated data elements. During query processing, in the event that the query matches the index, the pointers stored in the index are used to retrieve the corresponding data elements pointed therefrom. Aggregation indexing integrates an aggregation index with an inverted list index to provide pointers to raw data elements that require aggregation, thereby providing for dynamic summarization of the raw data elements that match the user-submitted query.

These indexing schemes are intended to improve join operations by replacing table scan operations with one or more index lookup operation in order to locate the data elements that match a query. However, these indexing schemes suffer from various performance issues as follows:

Since the tables in the star schema design typically contain the entire hierarchy of attributes (e.g. in a PERIOD dimension, this hierarchy could be day>week>month>quarter>year), a multipart key of day, week, month, quarter, year has to be created; thus, multiple meta-data definitions are required (one of each key component) to define a single relationship; this adds to the design complexity, and sluggishness in performance.

Addition or deletion of levels in the hierarchy will require physical modification of the fact table, which is time consuming process that limits flexibility.

Carrying all the segments of the compound dimensional key in the fact table increases the size of the index, thus impacting both performance and scalability.

Another performance issue arises from dimension tables that contain multiple hierarchies. In such cases, the dimensional table often includes a level of hierarchy indicator for every record. Every retrieval from fact table that stores details and aggregates must use the indicator to obtain the correct result, which impacts performance. The best alternative to using the level indicator is the snowflake schema. In this schema aggregate tables are created separately from the detail tables. In addition to the main fact tables, snowflake schema contains separate fact tables for each level of aggregation. Notably, the snowflake schema is even more complicated than a star schema, and often requires multiple SQL statements to get the results that are required.

Another performance issue arises from the pairwise join problem. Traditional RDBMS engines are not design for the rich set of complex queries that are issued against a star schema. The need to retrieve related information from several tables in a single query—"join processing"—is severely limited. Many RDBMSs can join only two tables at a time. If a complex join involves more than two tables, the RDBMS needs to break the query into a series of pairwise joins. Selecting the order of these joins has a dramatic performance impact. There are optimizers that spend a lot of CPU cycles to find the best order in which to execute those joins. Unfortunately, because the number of combinations to be evaluated grows exponentially with the number of tables being joined, the problem of selecting the best order of pairwise joins rarely can be solved in a reasonable amount of time.

Moreover, because the number of combinations is often too large, optimizers limit the selection on the basis of a criterion of directly related tables. In a star schema, the fact table is the only table directly related to most other tables, meaning that the fact table is a natural candidate for the first pairwise join. Unfortunately, the fact table is the very largest table in the query, so this strategy leads to selecting a pairwise join order that generates a very large intermediate result set, severely affecting query performance.

This is an optimization strategy, typically referred to as Cartesian Joins, that lessens the performance impact of the pairwise join problem by allowing joining of unrelated tables. The join to the fact table, which is the largest one, is deferred until the very end, thus reducing the size of intermediate result sets. In a join of two unrelated tables every combination of the two tables' rows is produced, a Cartesian product. Such a Cartesian product improves query performance. However, this strategy is viable only if the Cartesian product of dimension rows selected is much smaller than the number of rows in the fact table. The multiplicative nature of the Cartesian join makes the optimization helpful only for relatively small databases.

In addition, systems that exploit hardware and software parallelism have been developed that lessens the performance issues set forth above. Parallelism can help reduce the execution time of a single query (speed-up), or handle additional Work without degrading execution time (scale-up).[).] For example, Red Bricku has developed STAR-join™ technology that provides high speed, parallelizable multi-table joins in a single pass, thus allowing more than two tables can be joined in a single operation. The core technology is an innovative approach to indexing that accelerates multiple joins. Unfortunately, parallelism can only reduce. not eliminate, the performance degradation issues related to the star schema.

One of the most fundamental principles of the multidimensional database is the idea of aggregation. The most common aggregation is called a roll-up aggregation. This type is relatively easy to compute: e.g. taking daily sales totals and rolling them up into a monthly sales table. The more difficult are analytical calculations, the aggregation of Boolean and comparative operators. However these are also considered as a subset of aggregation.

In a star schema, the results of aggregation are summary tables. Typically, summary tables are generated by database administrators who attempt to anticipate the data aggregations that the users will request, and then pre-build such tables. In such systems, when processing a user-generated query that involves aggregation operations, the pre-built aggregated data that matches the query is retrieved from the summary tables (if such data exists). FIGS. 5A and 5B illustrate a multi-dimensional relational database using a star schema and summary tables. In this example, the summary tables are generated over the "time" dimension storing aggregated data for "month", "quarter" and "year" time periods as shown in FIG. 5B. Summary tables are in essence additional fact tables, of higher levels. They are attached to the basic fact table creating a snowflake extension of the star schema. There are hierarchies among summary tables because users at different levels of management require different levels of summarization. Choosing the level of aggregation is accomplished via the "drill-down" feature.

Summary tables containing pre-aggregated results typically provide for improved query response time with respect to on-the-fly aggregation. However, summary tables suffer from some disadvantages:

summary tables require that database administrators anticipate the data aggregation operations that users will require; this is a difficult task in large multi-dimensional databases (for example, in data warehouses and data mining systems), where users always need to query in new ways looking for new information and patterns.

summary tables do not provide a mechanism that allows efficient drill down to view the raw data that makes up the summary table—typically a table scan of one or more large tables is required.

querying is delayed until pre-aggregation is completed.

there is a heavy time overhead because the vast majority of the generated information remains unvisited.

there is a need to synchronize the summary tables before the use.

the degree of viable parallelism is limited because the subsequent levels of summary tables must be performed in pipeline, due to their hierarchies.

for very large databases, this option is not valid because of time and storage space.

Note that it is common to utilize both pre-aggregated results and on-the-fly aggregation in support aggregation. In these system, partial pre-aggregation of the facts results in a small set of summary tables. On-the-fly aggregation is used in the case the required aggregated data does not exist in the summary tables.

Note that in the event that the aggregated data does not exist in the summary tables, table join operations and aggregation operations are performed over the raw facts in order to generate such aggregated data. This is typically referred to as on-the-fly aggregation. In such instances, aggregation indexing is used to mitigate the performance of multiple data joins associated with dynamic aggregation of the raw data. Thus, in large multi-dimensional databases, such dynamic aggregation may lead to unacceptable query response times.

In view of the problems associated with joining and aggregation within RDBMS, prior art ROLAP systems have suffered from essentially the same shortcomings and drawbacks of their underlying RDBMS.

While prior art MOLAP systems provide for improved access time to aggregated data within their underlying MDD structures, and have performance advantages when carrying out joining and aggregations operations, prior art MOLAP architectures have suffered from a number of shortcomings and drawbacks which Applicants have detailed in their copending U.S. application Ser. Nos. 09/368,241 and 09/514,611 incorporated herein by reference.

In summary, such shortcomings and drawbacks stem from the fact that there is unidirectional data flow from the RDBMS to the MOLAP system. More specifically, atomic (raw) data is moved, in a single transfer, to the MOLAP system for aggregation, analysis and querying. Importantly, the aggregation results are external to the RDBMS. Thus, users of the RDBMS cannot directly view these results. Such results are accessible only from the MOLAP system. Because the MDD query processing logic in prior art MOLAP systems is separate from that of the RDBMS, users must procure rights to access to the MOLAP system and be instructed (and be careful to conform to such instructions) to access the MDD (or the RDBMS) under certain conditions. Such requirements can present security issues, highly undesirable for system administration. Satisfying such requirements is a costly and logistically cumbersome process. As a result, the widespread applicability of MOLAP systems has been limited.

Thus, there is a great need in the art for an improved mechanism for joining and aggregating data elements within a relational database management system, and for integrating the improved relational database management system into informational database systems (including the data warehouse and OLAP domains), while avoiding the shortcomings and drawbacks of prior art systems and methodologies.

SUMMARY AND OBJECTS OF PRESENT INVENTION

Accordingly, it is an object of the present invention to provide an improved method of and system for joining and aggregating data elements integrated within a relational database management system (RDBMS) using a non-relational multi-dimensional data structure (MDD) achieving a significant increase in system performance (e.g. [deceased] decreased access/search time), user flexibility and ease of use.

Another object of the present invention is to provide such an RDBMS wherein its integrated data aggregation module supports high-performance aggregation (i.e. data roll-up) processes to maximize query performance of large data volumes.

Another object of the present invention is to provide such an RDBMS system, wherein its integrated data aggregation (i.e. roll-up) module speeds up the aggregation process by orders of magnitude, enabling larger database analysis by lowering the aggregation times.

Another object of the present invention is to provide such a novel RDBMS system for use in OLAP operations.

Another object of the present invention is to provide a novel RDBMS system having an integrated aggregation module that carries out an novel rollup (i.e. down-up) and spread down (i.e. top-down) aggregation algorithms.

Another object of the present invention is to provide a novel RDBMS system having an integrated aggregation module that carries out full pre-aggregation and/or "on-the-fly" aggregation processes.

Another object of the present invention is to provide a novel RDBMS system having an integrated aggregation module which is capable of supporting a MDD having a multi-hierarchy dimensionality.

These and other object of the present invention will become apparent hereinafter and in the claims to Invention set forth herein.

BRIEF DESCRIPTION OF THE DRAWINGS

In order to more fully appreciate the objects of the present invention, the following Detailed Description of the Illustrative Embodiments should be read in conjunction with the accompanying Drawings, wherein:

FIGS. 3A–3C are schematic representations of exemplary tables employed in a prior art Relational Database Management System (RDBMS); FIGS. 3B and 3C illustrate operators (queries) on the table of FIG. 3A, and the result of such queries, respectively.

FIG. 4B is a schematic representation of tables used to implement the schema shown in FIG. 4A.

FIGS. 6C(1) and 6C(2), taken together, set forth a flow chart representation of the primary operations carried out within the RDBMS of the present invention when performing data aggregation and related support operations, including the servicing of user-submitted (e.g. natural language) queries made on such aggregated database of the present invention.

FIG. 8A is a data table setting forth information representative of performance benchmarks obtained by the shared-platform type implementation of the MDD Aggregation Module of the illustrative embodiment serving the conventional OLAP server (i.e. Oracle EXPRESS Server, wherein the common hardware/software platform is realized using a Pentium II 450 Mhz, 1 GB RAM, 18 GB Disk, running the Microsoft NT operating system (OS);

FIG. 9C1 is a schematic representation of the Query Directed Roll-up (QDR) aggregation method/procedure of the present invention, showing data aggregation starting from existing basic data or previously aggregated data in the first dimension (D1), and such aggregated data being utilized as a basis for QDR aggregation along the second dimension (D2).

FIG. 9C2 is a schematic representation of the Query Directed Roll-up (QDR) aggregation method/procedure of the present invention, showing initial data aggregation starting from existing previously aggregated data in the second third (D3), and continuing along the third dimension (D3), and thereafter continuing aggregation along the second dimension (D2).

FIG. 11A is a schematic representation of three exemplary multi-hierarchical data structures for storage of data within the MDDB of FIG. 6B, having three levels of hierarchy, wherein the first level representative of base data is composed of items A,B,F, and G, the second level is composed of items C,E,H and I, and the third level is composed of a single item D, which is common to all three hierarchical structures.

FIG. 11B is a schematic representation of an optimized multi-hierarchical data structure merged from all three hierarchies of FIG. 11A, in accordance with the principles of the present invention.

DETAILED DESCRIPTION OF THE PREFERRED EMBODIMENTS OF THE PRESENT INVENTION

Referring now to FIG. 6 through FIG. 13, the preferred embodiments of the method and system of the present invention will be now described in great detail herein below.

Through this document, the term "aggregation" and "pre-aggregation" shall be understood to mean the process of summation of numbers, as well as other mathematical operations, such as multiplication, subtraction, division etc. It shall be understood that pre-aggregation operations occur asynchronously with respect to the traditional query processing operations. Moreover, the term "atomic data" shall be understood to refer to the lowest level of data granularity required for effective decision making. In the case of a retail merchandising manager, atomic data may refer to information by store, by day, and by item. For a banker, atomic data may be information by account, by transaction, and by branch.

In general, the improved RDBMS system of the present invention excels in performing two distinct functions, namely: the aggregation of data; and the handling of the resulting data for "on demand" client use. Moreover, because of improved data aggregation capabilities, the RDBMS of the present invention can be employed in a wide range of applications, including Data Warehouses supporting OLAP systems and the like. For purposes of illustration, initial focus will be accorded to the RDMS of the present invention.

Figure 6A:
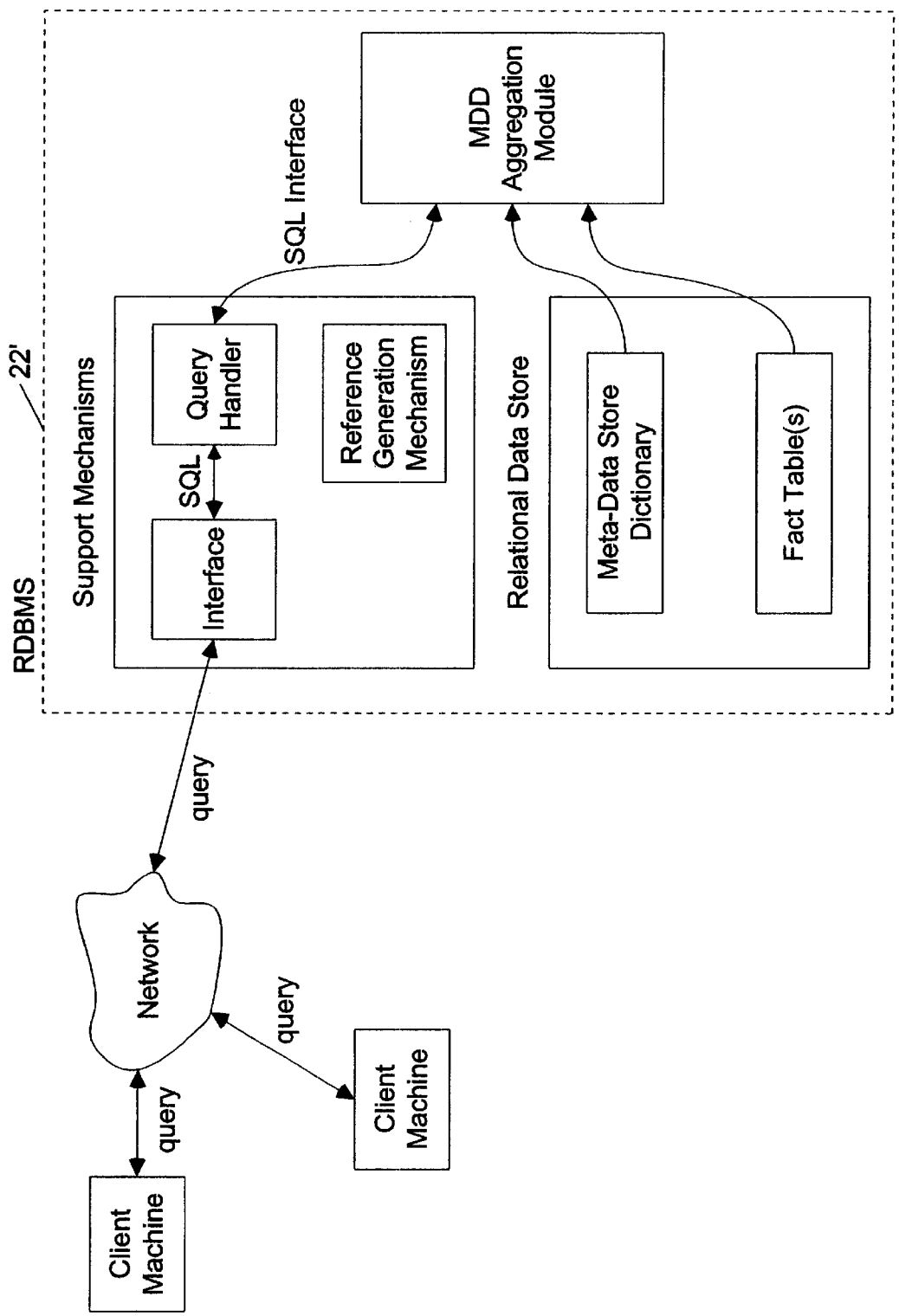
FIG. 6A is a schematic representation of a generalized embodiment of an RDBMS of the present invention comprising a relational database having an integrated multidimensional (MDD) aggregation module supporting queries from a plurality of clients, wherein the aggregation engine performs aggregation functions (e.g. summation of numbers, as well as other mathematical operations, such as multiplication, subtraction, division etc.) and non-relational multi-dimensional data storage functions.

FIG. 6A illustrates the primary components of an illustrative embodiment of the RDBMS of the present invention, namely: support mechanisms including a query interface and query handler, a relational data store including one or more fact tables and a meta-data store for storing a dictionary (catalogue), and an MDD Aggregation Module that stores atomic data and aggregated data in a non-relational MDD. It should be noted that the RDBMS typically includes additional components (not shown) that are not relevant to the present invention. The query interface and query handler service user-submitted queries (in the preferred embodiment, SQL query statements) forwarded, for example, from a client machine over a network as shown. The query handler, fact table and meta-data store communicate to the MDD Aggregation Module. Importantly, the query handler and integrated MDD Aggregation Module operates to provide for dramatically improved query response times for data aggregation operations and drill-downs. Moreover, it is an object of the present invention is to make user-querying of the non-relational MDDB no different than querying a relational table of the RDBMS, in a manner that minimizes the delays associated with queries that involve aggregation or drill down operations. This object is enabled by providing the novel RDBMS system and integrated aggregation mechanism of the present invention.

Figure 6B:
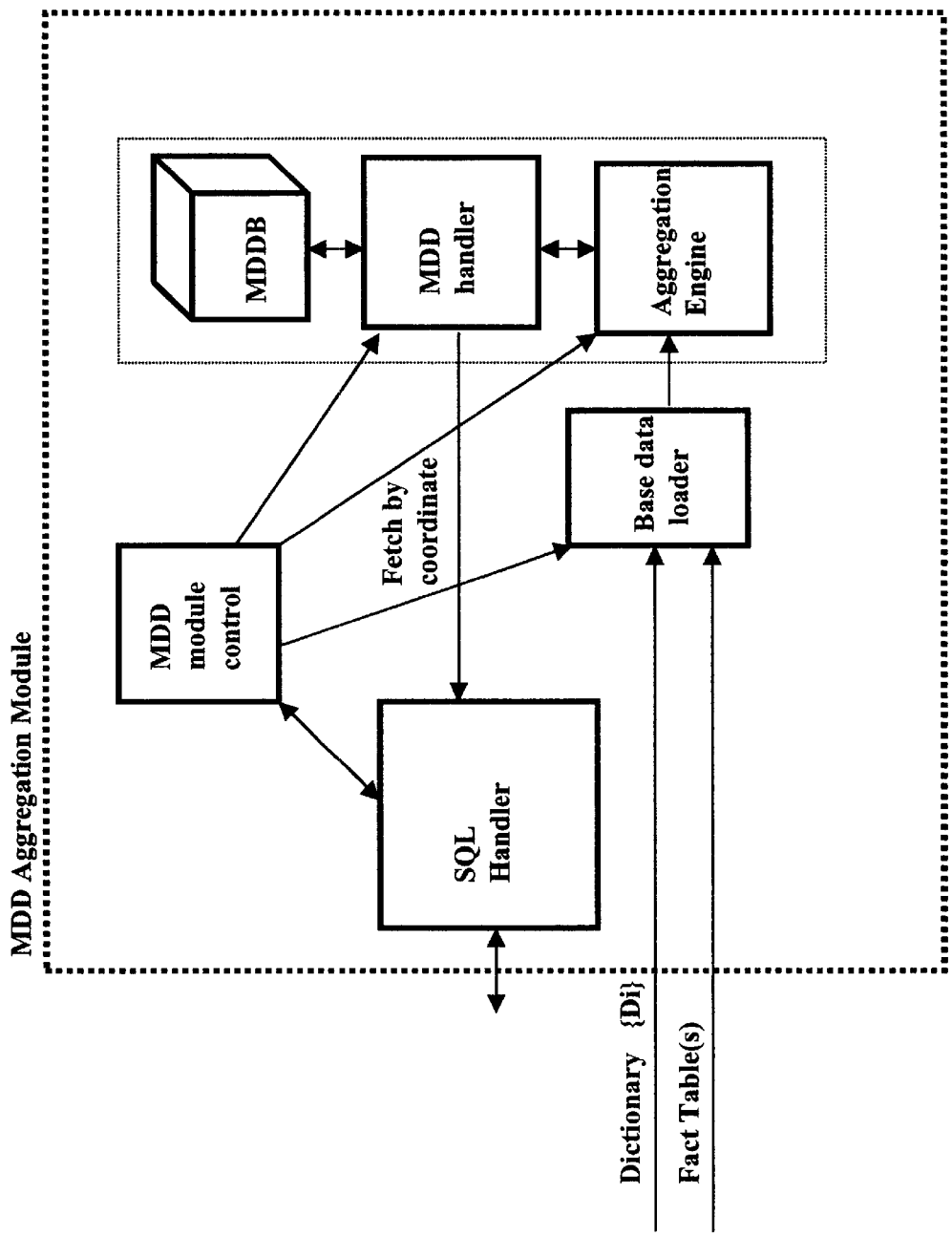
FIG. 6B is a schematic block diagram of the MDD aggregation module of the illustrative embodiment of the present invention shown in FIG. 6A.

FIG. 6B shows the primary components of an illustrative embodiment of the MDD Aggregation Module of FIG. 6A, namely: a base data loader for loading the directory and fact table(s) of the RDBMS; an aggregation engine for receiving dimension data and fact data from the base loader, a multi-dimensional database (MDDB); a MDDB handler, an SQL handler that operates cooperatively with the query handler of the RDBMS to provide users with query access to the MDD Aggregation Module, and a control module for managing the operation of the components of the MDD aggregation module. The base data loader may load the directory and fact tables over a standard interface (such as OLDB, OLE-DB, ODBC, SQL, API, JDBC, etc.). In this case, the RDBMS and base data loader include components that provide communication of such data over these standard interfaces. Such interface components are well known in the art. For example, such interface components are readily available from Attunity Corporation, http://www.attunity.com.

During operation, the base data originates from the fact table(s) of the RDBMS. The core data aggregation operations are performed by the Aggregation Engine; a Multidimensional Data Handler; and a Multidimensional Data Storage. The results of data aggregation are efficiently stored in a multidimensional data storage (MDDB), by the Data Handler. The SQL handler of the MDD Aggregation module services user-submitted queries (in the preferred embodiment, SQL query statements) forwarded from the query handler of the RDBMS. The SQL handler of the MDD Aggregation module may communicate with the query handler of the RDBMS over a standard interface (such as OLDB, OLE-DB, ODBC, SQL, API, JDBC, etc.). In this case, the support mechanisms of the RDBMS and SQL handler include components that provide communication of such data over these standard interfaces. Such interface components are well known in the art. Aggregation (or drill down results) are retrieved on demand and returned to the user.

Typically, a user interacts with a client machine (for example, using a web-enabled browser) to generate a natural language query, that is communicated to the query interface of the RDBMS, for example over a network as shown. The query interface disintegrates the query, via parsing, into a series of requests (in the preferred embodiment, SQL statements) that are communicated to the query handler of the RDBMS. It should be noted that the functions of the query interface may be implemented in a module that is not part of the RDBMS (for example, in the client machine). The query handler of the RDBMS forwards requests that involve data stored in the MDD of the MDD Aggregation module to the SQL hander of the MDD Aggregation module for servicing. Each request specifies a set of n-dimensions. The SQL handler of the MDD Aggregation Module extracts this set of dimensions and operates cooperatively with the MDD handler to address the MDDB using the set of dimensions, retrieve the addressed data from the MDDB, and return the results to the user via the query handler of the RDBMS.

FIG. 6C(i) and 6C(ii) is a flow chart illustrating the operations of an illustrative RDBMS of the present invention. In step 601, the base data loader of the MDD Aggregation Module loads the dictionary (or catalog) from the meta-data store in the RDBMS. In performing this function, the base data loader may utilize an adapter (interface) that maps the data types of the dictionary of the RDBMS (or that maps a standard data type used to represent the dictionary of the RDBMS) into the data types used in the MDD aggregation module. In addition, the base data loader extracts the dimensions from the dictionary and forwards the dimensions to the aggregation engine of the MDD Aggregation Module.

In step 603, the base data loader loads the fact table(s) from the RDBMS. In performing this function, the base data loader may utilize an adapter (interface) that maps the data types of the fact table(s) of the RDBMS (or that maps a standard data type used to represent the fact table(s) of the RDBMS) into the data types used in the MDD Aggregation Module. In addition, the base data loader extracts the atomic data from the fact table, and forwards the atomic data to the aggregation engine.

In step 605, the aggregation engine rolls-up (aggregates) the atomic data (provided by the base data loader in step 603) along at least one of the dimensions and operates cooperatively with the MDD handler to store the resultant aggregated data in the MDD database. A more detailed description of exemplary aggregation operations according to a preferred embodiment of the present invention is set forth below with respect to the QDR process of FIGS. 9A–9C.

In step 607, a reference is defined that provides users with the ability to query the data generated by the MDD Aggregation Module and/or stored in the MDDB of the MDD Aggregation Module. This reference is preferably defined using the Create View SQL statement, which allows the user to: i) define a table name (TN) associated with the MDD database stored in the MDD Aggregation Module, and ii) define a link used to route SQL statements on the table TN to the MDD Aggregation Module. In this embodiment, the view mechanism of the RDBMS enables reference and linking to the data stored in the MDDB of the MDD Aggregation Engine as illustrated in FIG. 6(E). A more detailed description of the view mechanism and the Create View SQL statement may be found in C. J. Date, "An Introduction to Database Systems," Addison-Wesley, Seventh Edition, 2000, pp. 289–326, herein incorporated by reference in its entirety. Thus, the view mechanism enables the query handler of the RDBMS system to forward any SQL query on table TN to the MDD aggregation module via the associated link. In an alternative embodiment, a direct mechanism (e.g., NA trigger mechanism) may be used to enable the RDBMS system to reference and link to the data generated by the MDD Aggregation Module and/or stored in the MDDB of the MDD Aggregation Engine as illustrated in FIG. 6F. A more detailed description of trigger mechanisms and methods may be found in C. J. Date, "An Introduction to Database Systems," Addison-Wesley, Seventh Edition, 2000, pp. 250, 266, herein incorporated by reference in its entirety.

In step 609, a user interacts with a client machine to generate a query, and the query is communicated to the query interface. The query interface generate one or more SQL statements on the reference defined in step 607 (this reference refers to the data stored in the MDDB of the MDD Aggregation Module), and forwards the SQL statement(s) to the query handler of the RDBMS.

In step 611, the query handler receives the SQL statement (s); and optionally transforms such SQL statement(s) to optimize the SQL statement (s) for more efficient query handling. Such transformations are well known in the art. For example, see Kimball, Aggregation Navigation With (Almost) No MetaData", DBMS Data Warehouse Supplement, August 1996, available at http://www.dbmsmag.com/9608d54.html.

In step 613: the query handler determines whether the received SQL statement(s) [or transformed SQL statement (s)] is on the reference generated in step 607. If so, operation continues to step 615; otherwise normal query handling operations continue is step 625

In step 615, the received SQL statement(s) [or transformed SQL statement(s)] is routed to the MDD aggregation engine for processing in step 617 using the link for the reference as described above with respect to step 607.

In step 617, the SQL statement(s) is received by the SQL handler of the MDD Aggregation Module, wherein a set of one or more N-dimensional coordinates are extracted from the SQL statement. In performing this function, SQL handler may utilize an adapter (interface) that maps the data types of the SQL statement issued by query handler of the RDBMS (or that maps a standard data type used to represent the SQL statement issued by query handler of the RDBMS) into the data types used in the MDD aggregation module.

In step 619, the set of N-dimensional coordinates extracted in step 617 are used by the MDD handler to address the MDDB and retrieve the corresponding data from the MDDB.

Finally, in step 621, the retrieved data is returned to the user via the RDBMS (for example, by forwarding the retrieved data to the SQL handler, which returns the retrieved data to the query handler of the RDBMS system, which returns the results of the user-submitted query to the user via the client machine), and the operation ends.

It should be noted that the facts (base data), as it arrives from RDBMS, may be analyzed and reordered to optimize hierarchy handling, according to the unique method of the present invention, as described later with reference to FIGS. 11A and 11B.

Figure 9A:
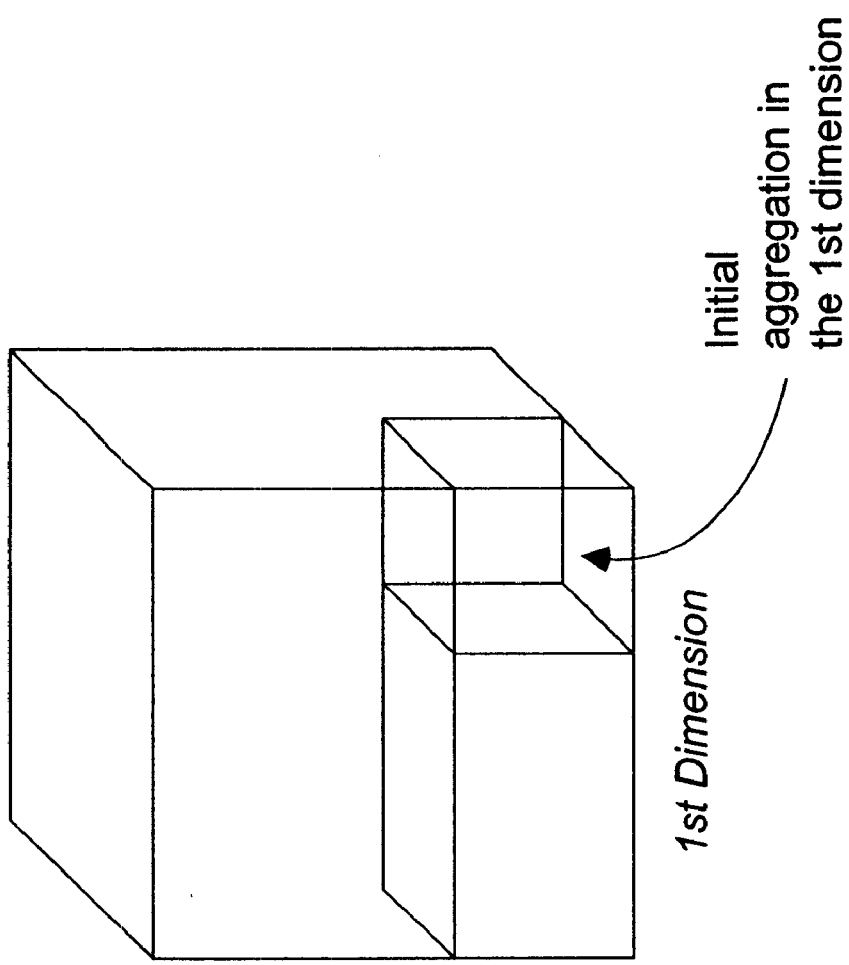
FIG. 9A is a schematic representation of the first stage in the method of segmented aggregation according to the principles of the present invention, showing initial aggregation along the 1st dimension.
Figure 9B:
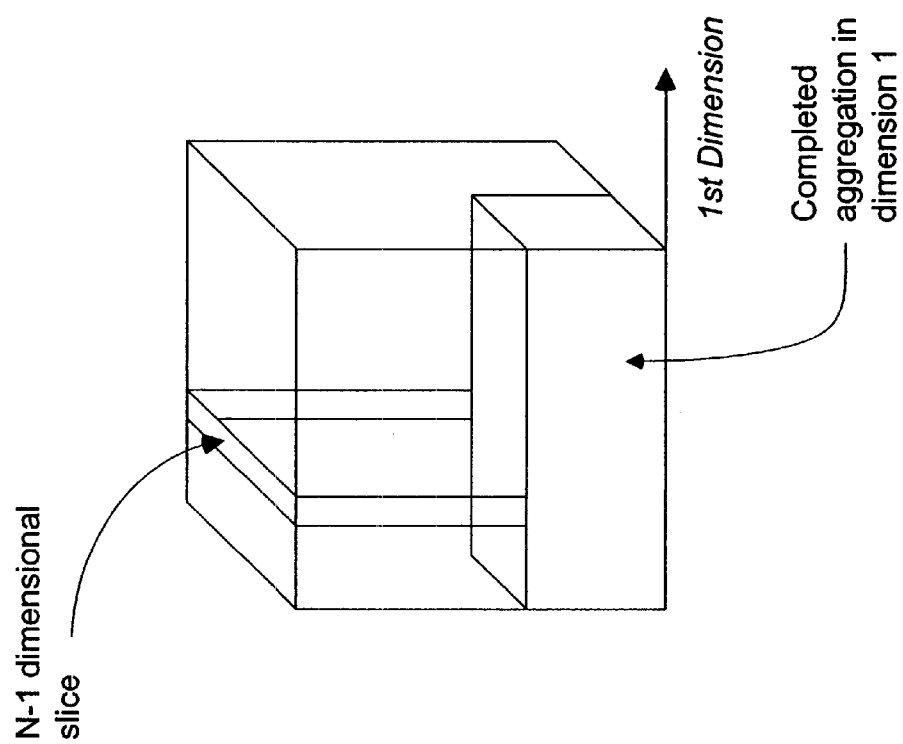
FIG. 9B is a schematic representation of the next stage in the method of segmented aggregation according to the principles of the present invention, showing that any segment along dimension 1, such as the shown slice, can be separately aggregated along the remaining dimensions, 2 and 3, and that in general, for an N dimensional system, the second stage involves aggregation in N–1 dimensions. The principle of segmentation can be applied on the first stage as well, however, only a large enough data will justify such a sliced procedure in the first dimension. Actually, it is possible to consider each segment as an N–1 cube, enabling recursive computation.

Moreover, the MDD control module of the MDD Aggregation Module preferably administers the aggregation process according to the method illustrated in FIGS. 9A and 9B. Thus, in accordance with the principles of the present invention, data aggregation within the RDBMS can be carried out either as a complete pre-aggregation process, where the base data is fully aggregated before commencing querying, or as a query directed roll-up (QDR) process, where querying is allowed at any stage of aggregation using the "on-the-fly" data aggregation process of the present invention. The QDR process will be described hereinafter in greater detail with reference to FIG. 9C. The response to a request (i.e. a basic component of a client query) requiring "on-the-fly" data aggregation, or requiring access to pre-aggregated result data via the MDD handler is provided by a query/request serving mechanism of the present invention within the MDD control module, the primary operations of which are illustrated in the flow chart of FIG. 6D. The function of the MDD Handler is to handle multidimensional data in the storage(s) module in a very efficient way, according to the novel method of the present invention, which will be described in detail hereinafter with reference to FIGS. 10A and 10B.

Figure 6D:
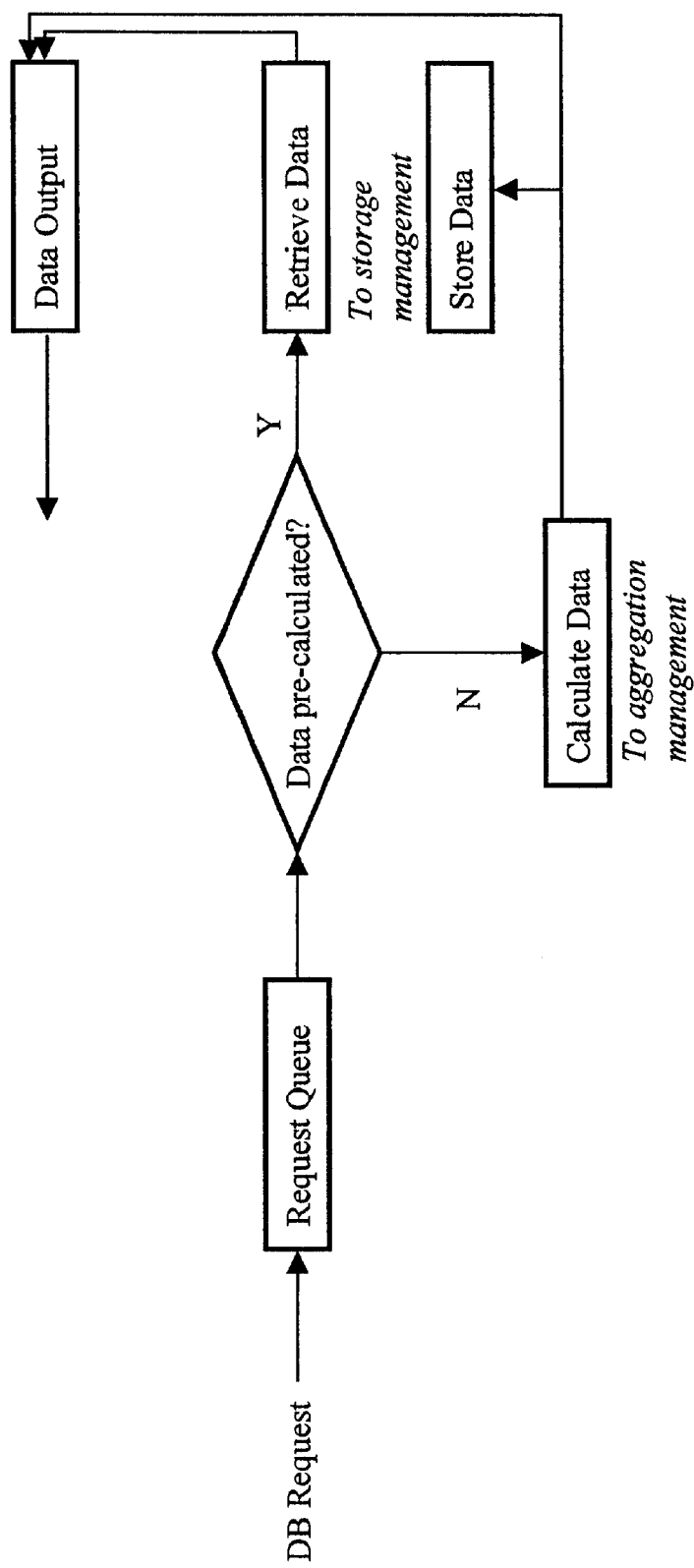
FIG. 6D is a flow chart representation of the primary operations carried out by the (DB) request serving mechanism within the MDD control module shown in FIG. 6B.
Figure 6E:
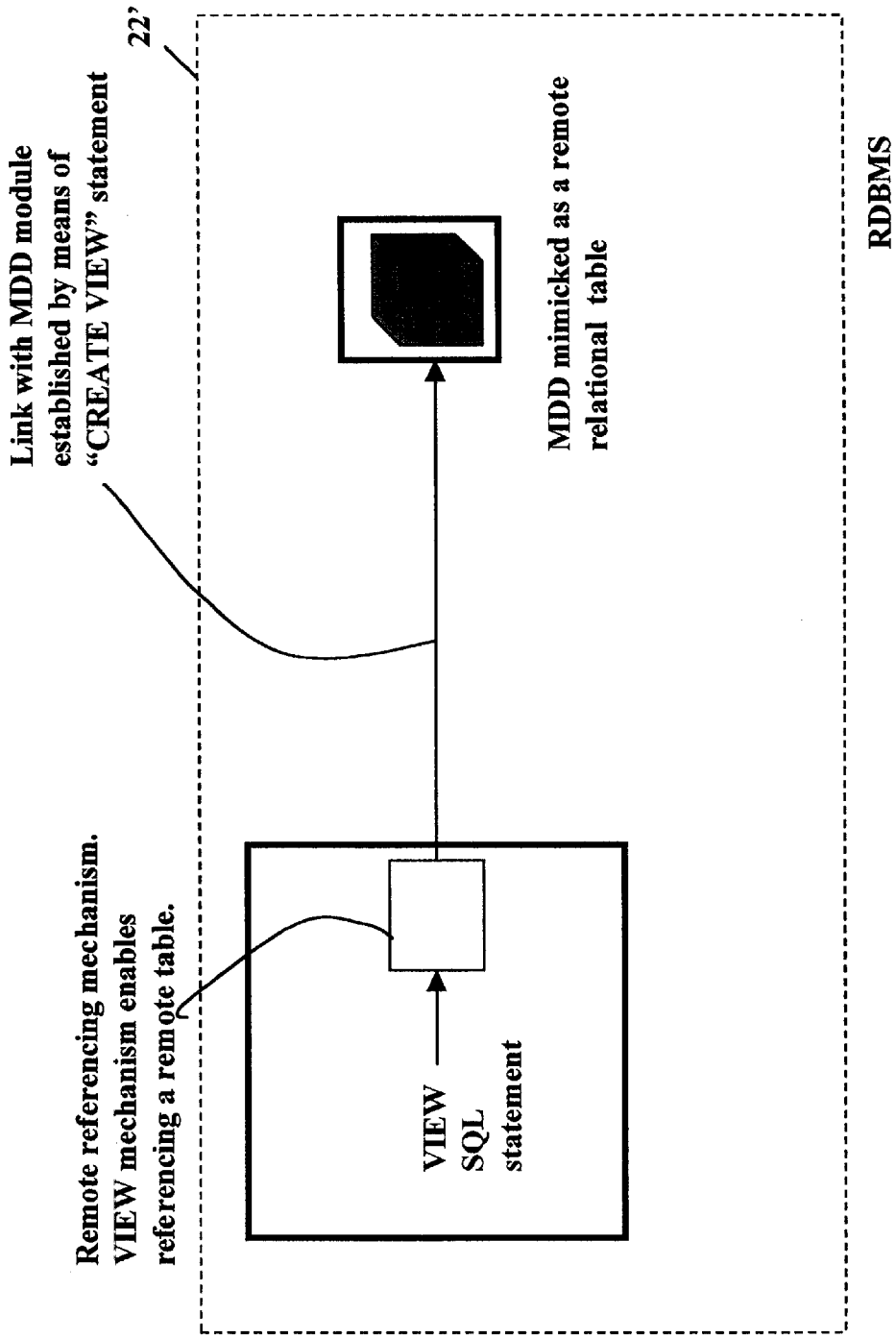
FIG. 6E is a schematic representation of the view mechanism of the RDBMS that enables users to query on the aggregated data generated and/or stored in the MDD Aggregation module according to the present invention.
Figure 6F:
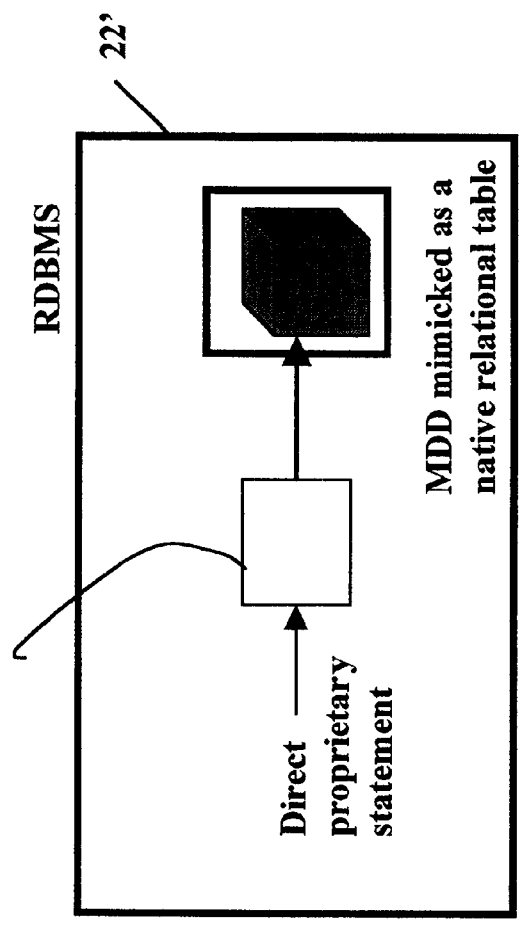
FIG. 6F is a schematic representation of the trigger mechanism of the RDBMS that enables users to query on the aggregated data generated and/or stored in the MDD Aggregation module according to the present invention.

The SQL handling mechanism shown in FIG. 6D is controlled by the MDD control module. Requests are queued and served one by one. If the required data is already pre-calculated, then it is retrieved by the MDD handler and returned to the client. Otherwise, the required data is calculated "on-the-fly" by the aggregation engine, and the result moved out to the client, while simultaneously stored by the MDD handler, shown in FIG. 6C.

Figure 7A:
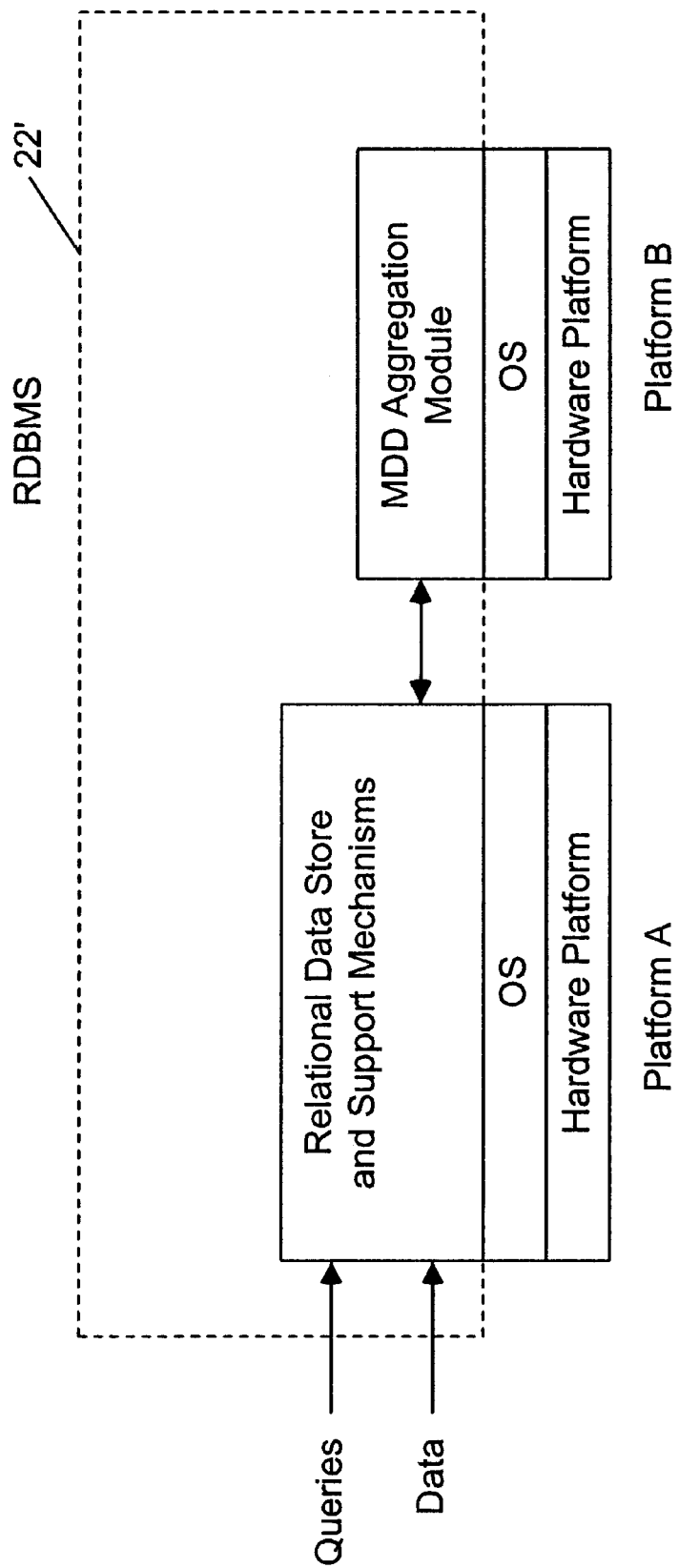
FIG. 7A shows a separate-platform implementation of the RDBMS system of the illustrative embodiment shown in FIG. 6A, wherein the query handling, fact table(s) and dictionary of the RDBMS resides on a separate hardware platform and/or OS system from that used to run the MDD Aggregation Module of the present invention.
Figure 7B:
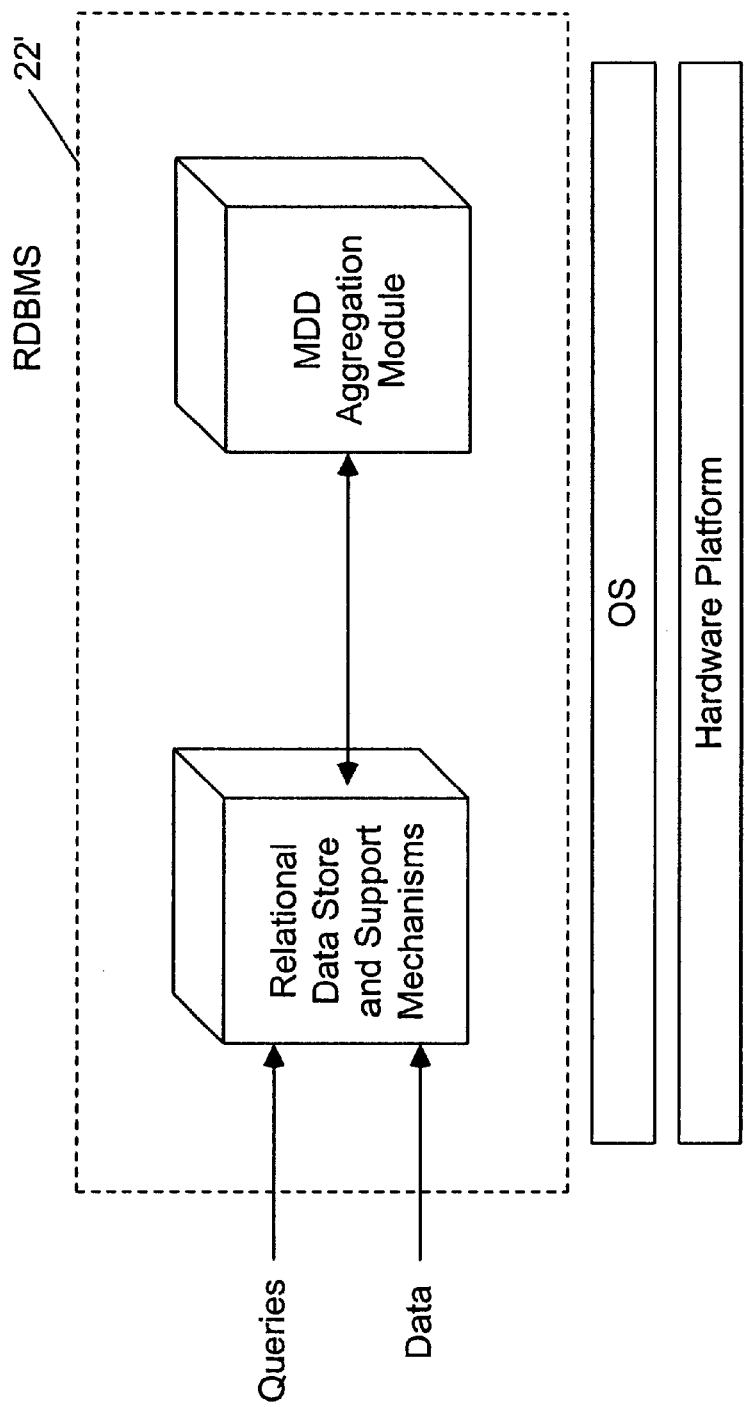
FIG. 7B shows a common-platform implementation of the RDBMS system of the illustrative embodiment shown in FIG. A, wherein the query handling, fact table(s) and dictionary of the RDBMS shares the same hardware platform and operating system (OS) that used to run the MDD Aggregation Module of the present invention.

FIGS. 7A and 7B outline two different implementations of the RDBMS system of the present invention. In both implementations, the query handler of the RDBMS system supplies aggregated results retrieved from the MDD to a client.

FIG. 7A shows a separate-platform implementation of the RDBMS system of the illustrative embodiment shown in FIG. 6A, wherein the support mechanisms (query handling) and relational data store (fact table(s) and dictionary) of the RDBMS resides on a separate hardware platform and/or OS system from that used to run the MDD Aggregation Module. In this type of implementation, it is even possible to run parts of the RDBMS system and the MDD Aggregation Module on different-type operating systems (e.g. NT, Unix, MAC OS).

FIG. 7B shows a common-platform implementation of the RDBMS system of the illustrative embodiment shown in FIG. A, wherein the support mechanisms (query handling) and the relational data store (fact table(s) and dictionary) of the RDBMS shares the same hardware platform and operating system (OS) that used to run the MDD Aggregation Module.

FIG. 8A shows a table setting forth the benchmark results of the MDD aggregation module, in accordance with the principles of the present invention. The platform and OS is realized using a Pentium II 450 Mhz, 1 GB RAM, 18 GB Disk, running the Microsoft NT operating system. The six (6) data sets shown in the table differ in number of dimensions, number of hierarchies, measure of sparcity and data size. A comparison with ORACLE Express, a major OLAP server, is made. It is evident that the MDD aggregation module of the present invention outperforms currently leading aggregation technology by more than an order of magnitude.

Figure 2:
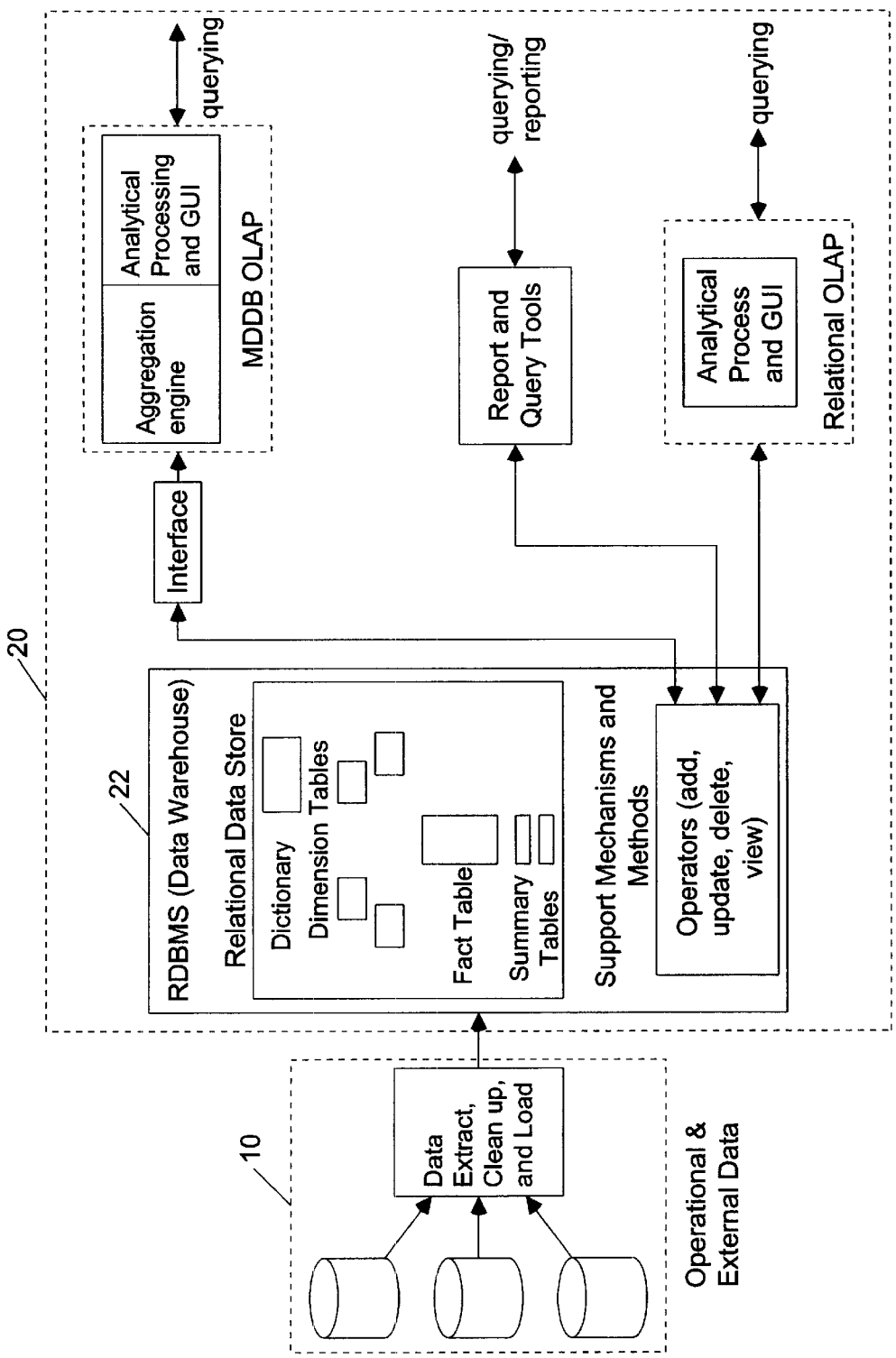
FIG. 2 is a schematic representation of the prior art data warehouse and OLAP system, wherein the present invention may be embodied.
Figure 4A:
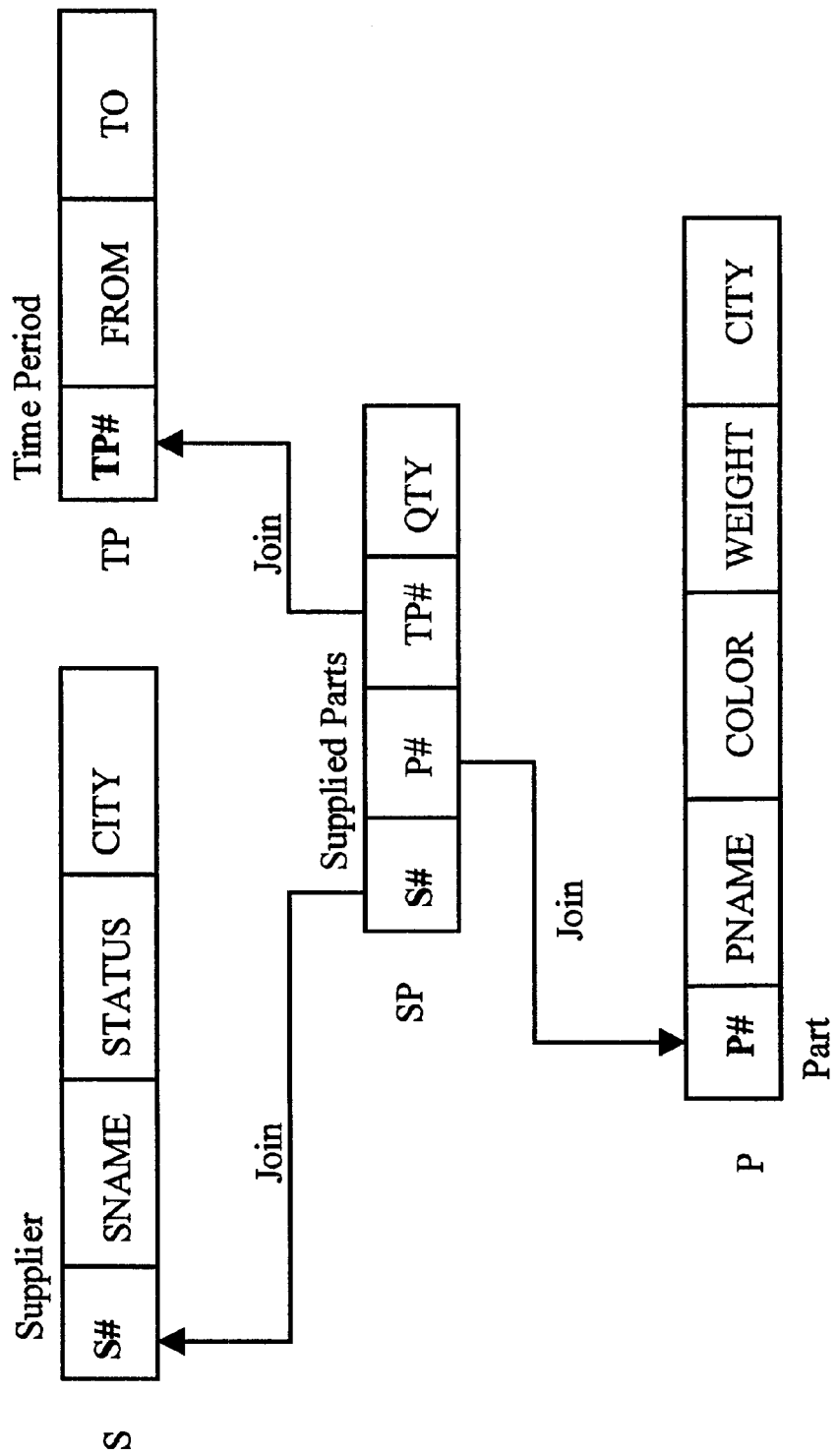
FIG. 4A is a schematic representation of an exemplary dimensional schema (star schema) of a relational database.
Figure 5A:
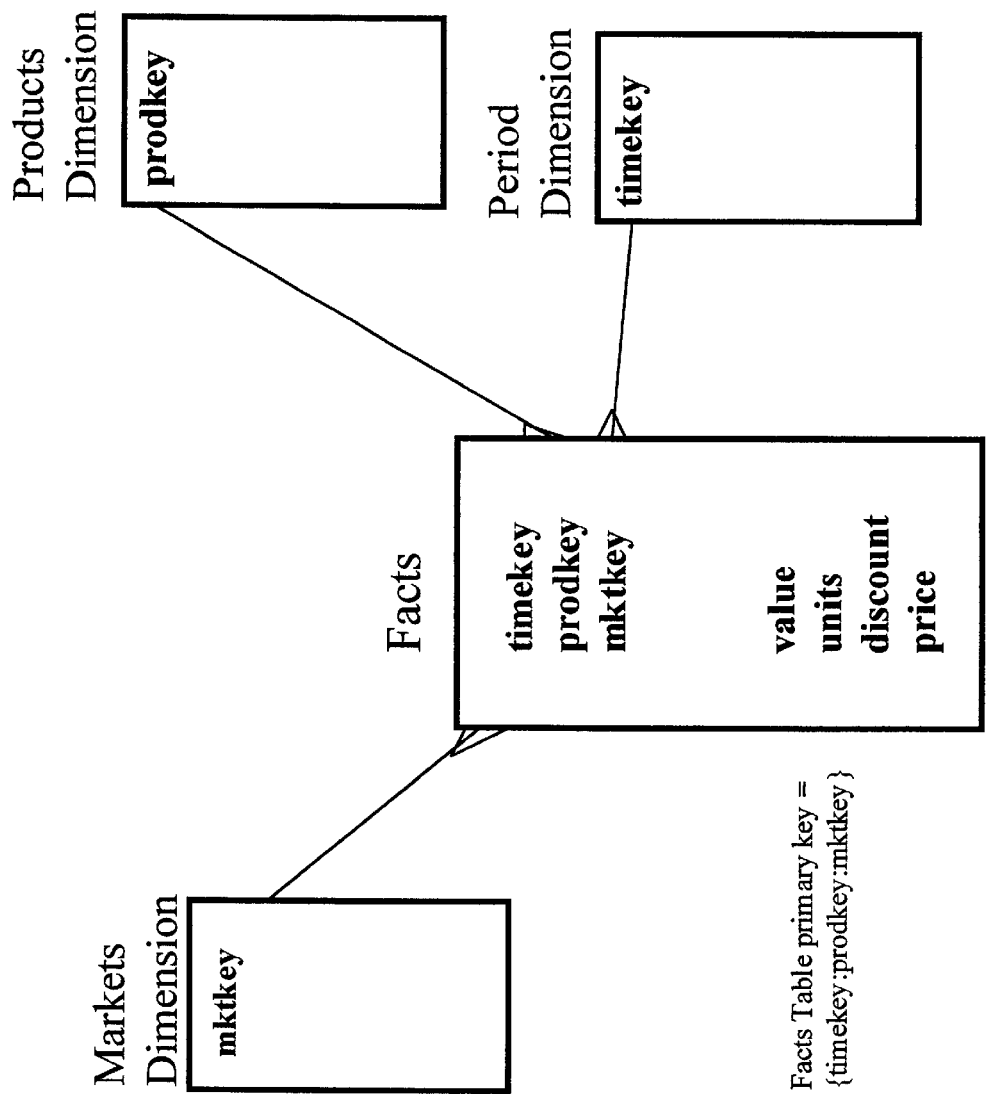
FIG. 5A is a schematic representation of an exemplary multidimensional schema (star schema).
Figure 5B:
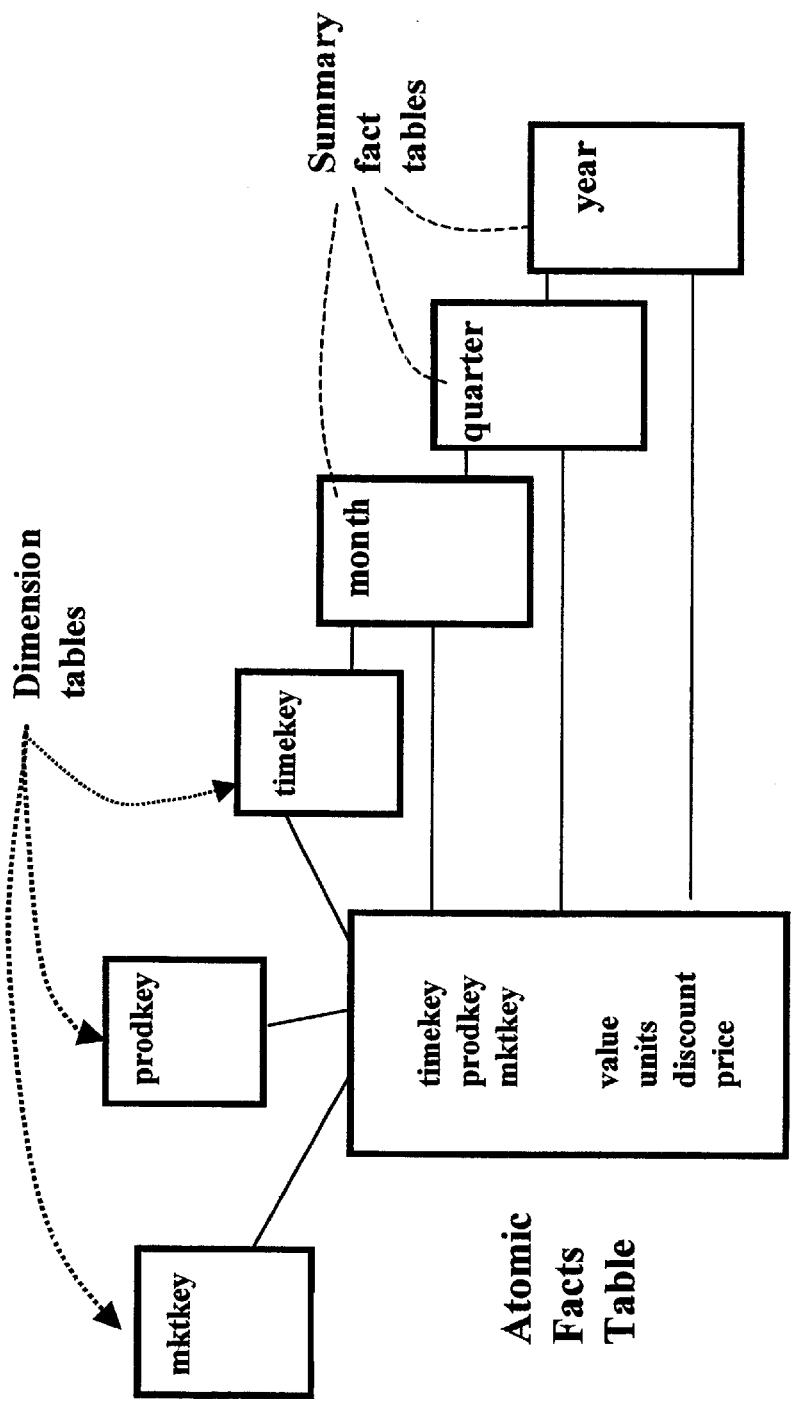
FIG. 5B is a schematic representation of tables used to implement the schema of FIG. 5A, including summary tables storing results of aggregation operations performed on the facts of the central fact table along the time-period dimension, in accordance with conventional teachings.

Preferably, the MDD aggregation module of the RDBMS of the present invention supports a segmented data aggregation method as described in FIGS. 9A through 9C2. These figures outline a simplified setting of three dimensions only; however, the following analysis applies to any number of dimensions as well.

The data is being divided into autonomic segments to minimize the amount of simultaneously handled data. The initial aggregation is practiced on a single dimension only, while later on the aggregation process involves all other dimensions.

At the first stage of the aggregation method, an aggregation is performed along dimension 1. The first stage can be performed on more than one dimension. As shown in FIG. 9A, the space of the base data is expanded by the aggregation process.

In the next stage shown in FIG. 9B, any segment along dimension 1, such as the shown slice, can be separately aggregated along the remaining dimensions, 2 and 3. In general, for an N dimensional system, the second stage involves aggregation in N–1 dimensions.

The principle of data segmentation can be applied on the first stage as well. However, only a large enough data set will justify such a sliced procedure in the first dimension. Actually, it is possible to consider each segment as an N−1 cube, enabling recursive computation.

It is imperative to get aggregation results of a specific slice before the entire aggregation is completed, or alternatively, to have the roll-up done in a particular sequence. This novel feature of the aggregation method of the present invention is that it allows the querying to begin, even before the regular aggregation process is accomplished, and still having fast response. Moreover, in relational OLAP and other systems requiring only partial aggregations, the QDR process dramatically speeds up the query response.

The QDR process is made feasible by the slice-oriented roll-up method of the present invention. After aggregating the first dimension(s), the multidimensional space is composed of independent multidimensional cubes (slices). These cubes can be processed in any arbitrary sequence.

Consequently the aggregation process of the present invention can be monitored by means of files, shared memory sockets, or queues to statically or dynamically set the roll-up order.

In order to satisfy a single query, before the required aggregation result has been prepared, the QDR process of the present invention involves performing a fast on-the-fly aggregation (roll-up) involving only a thin slice of the multidimensional data.

Figure 1:
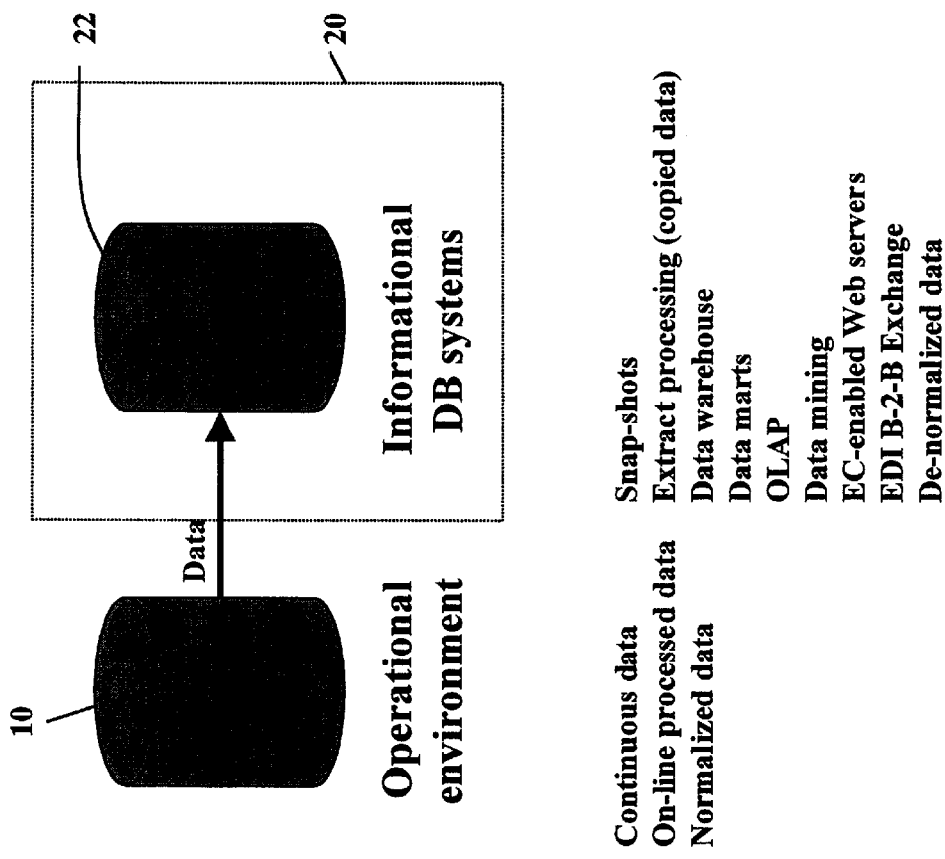
FIG. 1 is a schematic representation of a prior art information database system, wherein the present invention may be embodied.

FIG. 9C1 shows a slice required for building-up a roll-up result of the $2^{nd}$ dimension. In case 1, as shown, the aggregation starts from an existing data, either basic or previously aggregated in the first dimension. This data is utilized as a basis for QDR aggregation along the second dimension. In case 2, due to lack of previous data, a QDR involves an initial slice aggregation along dimension 3, and thereafter aggregation along the $2^{nd}$ dimension.

FIG. 9C2 shows two corresponding QDR cases for gaining results in the 3d dimension. Cases 1 and 2 differ in the amount of initial aggregation required in $2^{nd}$ dimension.

Figure 10A:
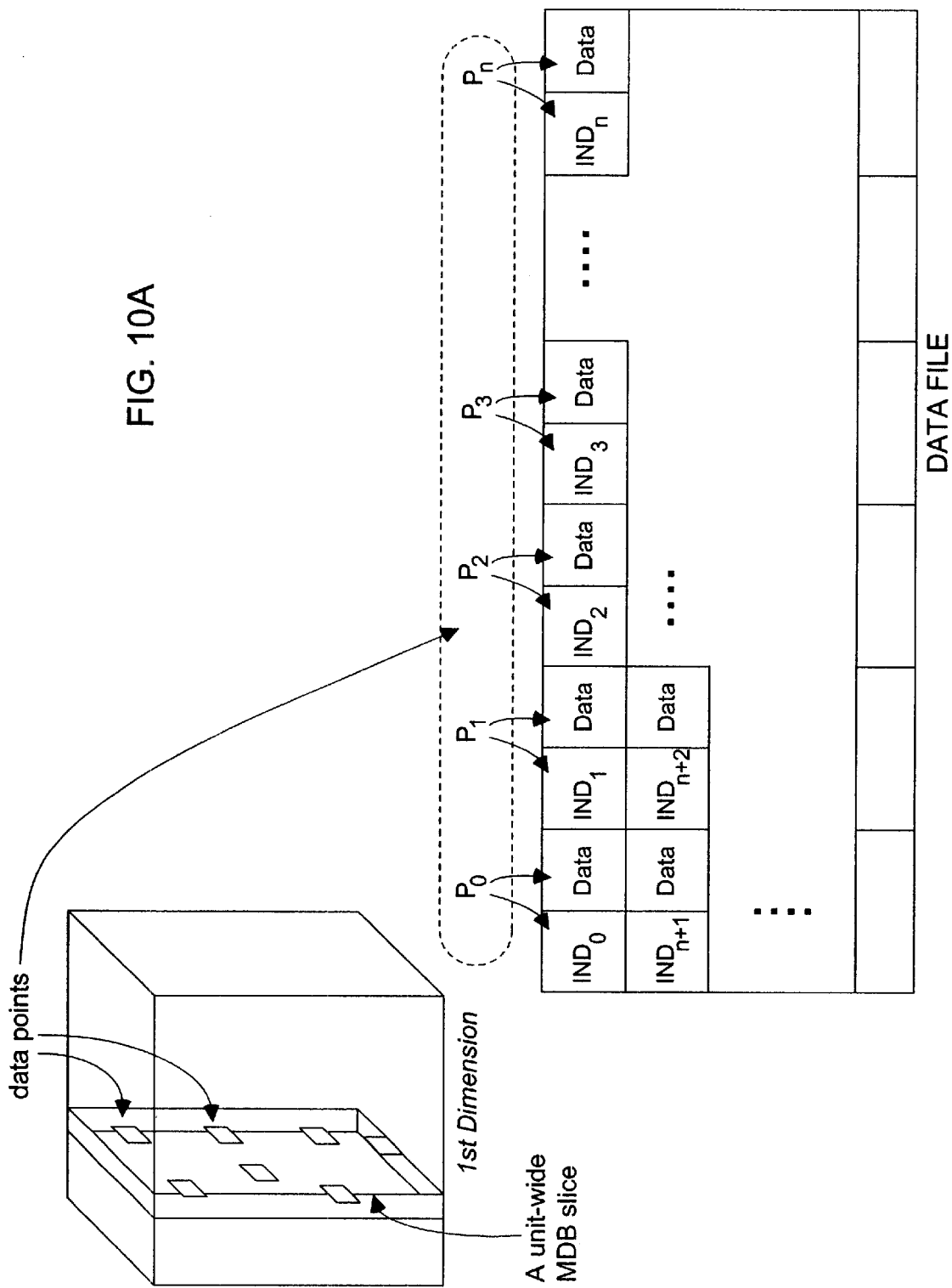
FIG. 10A is a schematic representation of the "slice-storage" method of storing sparse data in the disk storage devices of the MDDB of FIG. 6B in accordance with the principles of the present invention, based on an ascending-ordered index along aggregation direction, enabling fast retrieval of data.

FIG. 10A illustrates the "Slice-Storage" method of storing sparse data on storage disks. In general, this data storage method is based on the principle that an ascending-ordered index along aggregation direction, enables fast retrieval of data. FIG. 10A illustrates a unit-wide slice of the multidimensional cube of data. Since the data is sparse, only few non-NA data points exist. These points are indexed as follows. The Data File consists of data records, in which each N−1 dimensional slice is being stored, in a separate record. These records have a varying length, according to the amount of non-NA stored points. For each registered point in the record, $IND_k$ stands for an index in a n-dimensional cube, and Data stands for the value of a given point in the cube.

Figure 10B:
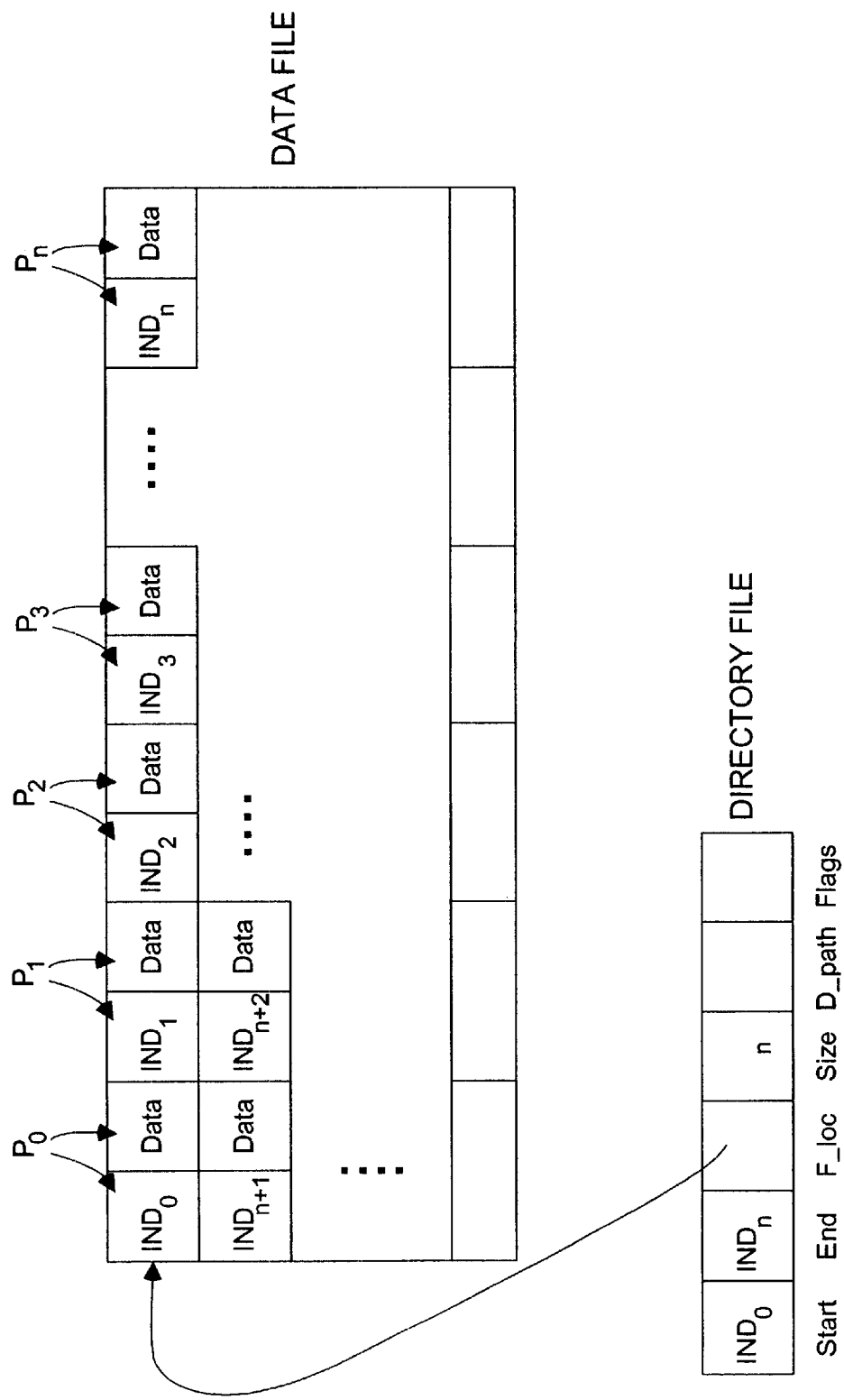
FIG. 10B is a schematic representation of the data organization of data files and the directory file used in the storage of the MDDB of FIG. 6B, and the method of searching for a queried data point therein using a simple binary search technique due to the data files ascending order.

FIG. 10B illustrates a novel method for randomly searching for a queried data point in the MDD of the RDBMS of the present invention by using a novel technique of organizing data files and the directory file used in the storage of the MDD, so that a simple binary search technique can then be employed within the aggregation module of the RDMB. According to this method, a metafile termed DIR File, keeps pointers to Data Files as well as additional parameters such as the start and end addresses of data record ($IND_o$, $IND_n$), its location within the Data File, record size (n), file's physical address on disk (D_Path), and auxiliary information on the record (Flags).

A search for a queried data point is then performed by an access to the DIR file. The search along the file can be made using a simple binary search due to file's ascending order. When the record is found, it is then loaded into main memory to search for the required point, characterized by its index $IND_k$. The attached Data field represents the queried value. In case the exact index is not found, it means that the point is a NA.

FIGS. 11A and 11B illustrate a novel method performed by the MDD aggregation module of the RDBMS of the present invention for pre-processing data such that multi-hierarchies in multi-hierarchical structures are optimally merged. According to the devised method, the inner order of hierarchies within a dimension is optimized, to achieve efficient data handling for summations and other mathematical formulas (termed in general "Aggregation"). The order of hierarchy is defined externally. It is brought from a data source to the stand-alone aggregation engine, as a descriptor of data, before the data itself. In the illustrative embodiment, the method assumes hierarchical relations of the data, as shown in FIG. 11A. The way data items are ordered in the memory space of the Aggregation Server, with regard to the hierarchy, has a significant impact on its data handling efficiency.

Notably, when using prior art techniques, multiple handling of data elements, which occurs when a data element is accessed more than once during aggregation process, has been hitherto unavoidable when the main concern is to effectively handle the sparse data. The data structures used in prior art data handling methods have been designed for fast access to a available data (not NA data). According to prior art techniques, each access is associated with a timely search and retrieval in the data structure. For the massive amount of data typically accessed from a Data Warehouse in an OLAP application, such multiple handling of data elements has significantly degraded the efficiency of prior art data aggregation processes. When using prior art data handling techniques, the data element D shown in FIG. 11 A must be accessed three times, causing poor aggregation performance.

In accordance with the present invention, the MDD aggregation module of the RDBMS performs the loading of base data and the aggregation and storage of the aggregated data in a way that limits the access of to a singular occurrence, as opposed to multiple occurrences as taught by prior art methods. According to the present invention, elements of base data and their aggregated results are contiguously stored in a way that each element will be accessed only once. This particular order allows a forward-only handling, never backward. Once a base data element is stored, or aggregated result is generated and stored, it is never to be retrieved again for further aggregation. As a result the storage access is minimized. This way of singular handling greatly elevates the aggregation efficiency of large data bases. The data element D, as any other element, is accessed and handled only once.

FIG. 11A shows an example of a multi-hierarchical database structure having 3 hierarchies. As shown, the base data includes the items A,B,F, and G., The second level is composed of items C,E,H and I. The third level has a single item D, which is common to all three hierarchical structures. In accordance with the method of the present invention, a minimal computing path is always taken. For example, according to the method of the present invention, item D will be calculated as part of structure 1, requiring two mathematical operations only, rather than as in structure 3, which would need four mathematical operations. FIG. 11B depicts an optimized structure merged from all three hierarchies.

Figure 12:
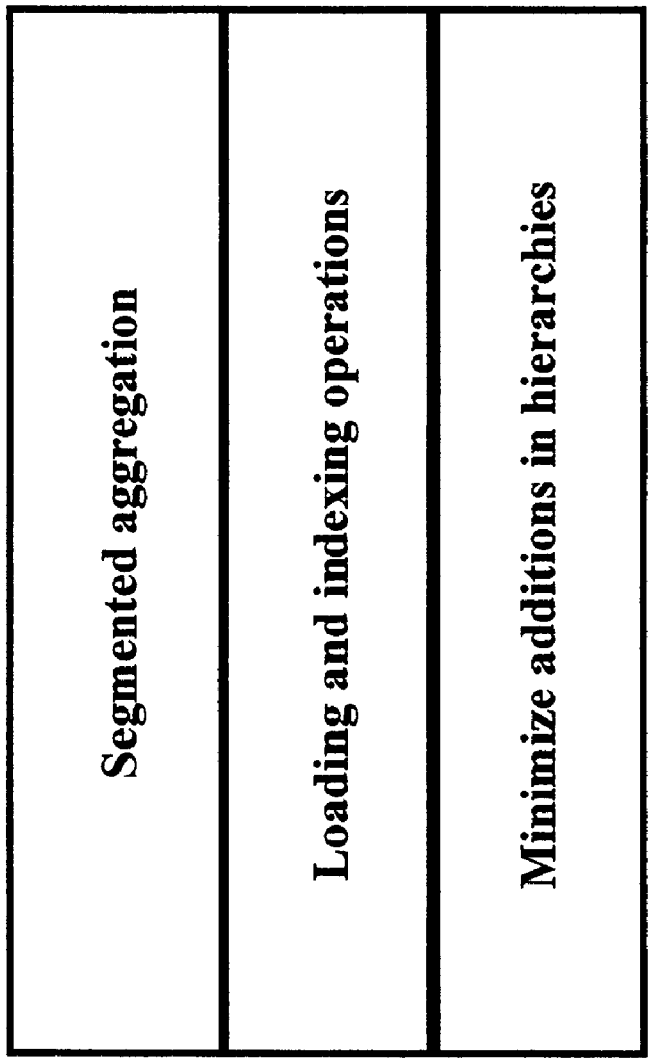
FIG. 12 is a schematic representation showing the levels of operations performed by the stand-alone Aggregation Server of FIG. 6B, summarizing the different enabling components for carrying out the method of segmented aggregation in accordance with the principles of the present invention.

FIG. 12 summarizes the different enabling components for segmented aggregation. The minimized operations in handling multi-hierarchies need analysis of the base data. It greatly optimizes data handling and contribute to aggregation speed. Based on this technology loading and indexing operations become very efficient, minimizing memory and storage access, and speeding up storing and retrieval operations. On top of all the enabling technologies is the segmented aggregation technique, not just outperforming by orders of magnitude the prior-art aggregation algorithms, but also enabling the unique QDR which waves out the need of waiting for full pre-aggregation.

Figure 13:
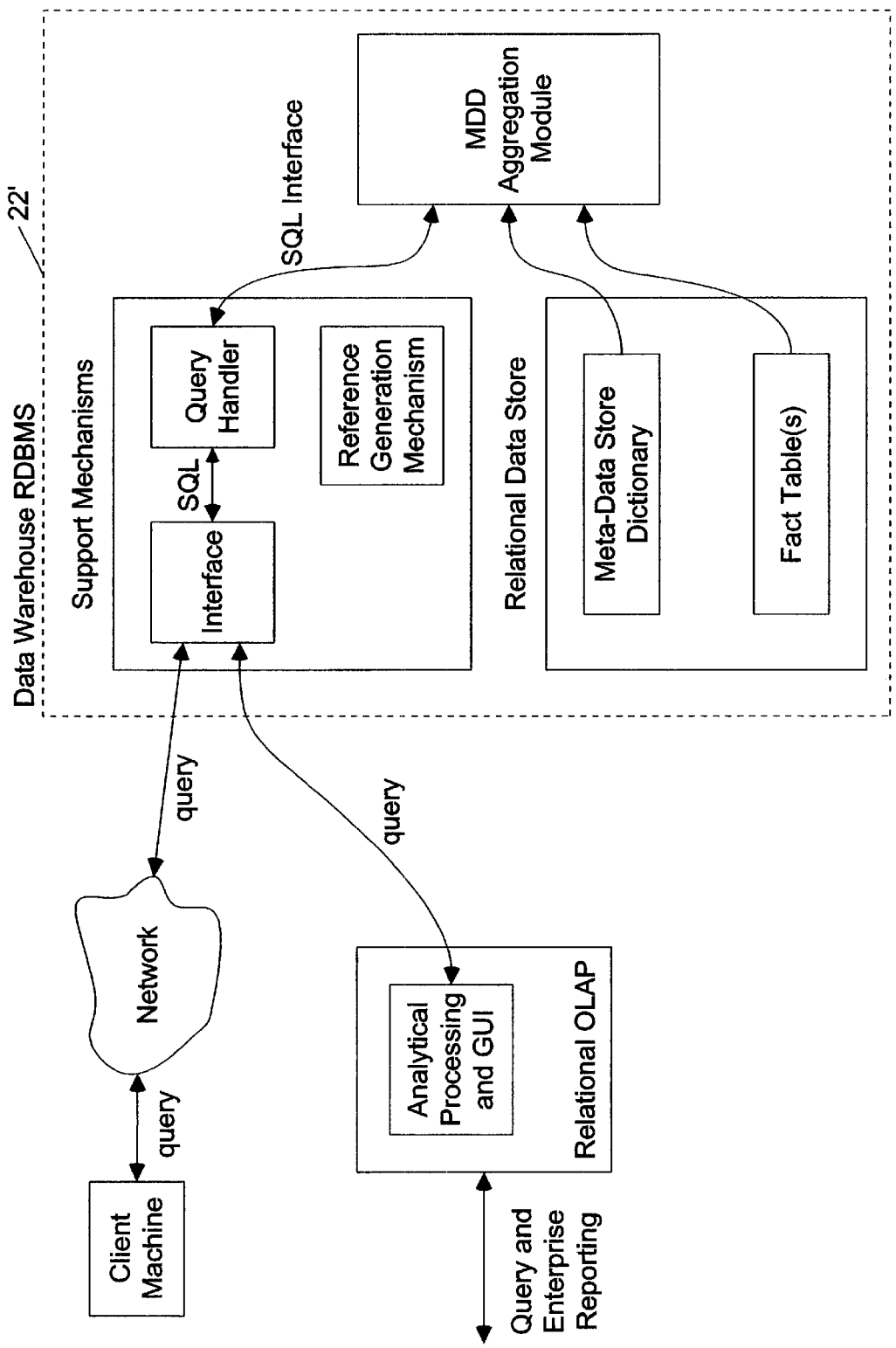
FIG. 13 is a schematic representation of the RDBMS of the present invention shown as a component of a central data warehouse, serving the data storage and aggregation needs of a ROLAP system (or other OLAP system).

FIG. 13 shows the improved RDBMS of the present invention as a component of a data warehouse, serving the data storage and aggregation needs of a ROLAP system (or other OLAP systems alike). Importantly, the improved RDBMS of the present invention provides flexible, high-performance access and analysis of large volumes of complex and interrelated data. Moreover, the improved Data Warehouse RDBMS of the present invention can simultaneously serve many different kinds of clients (e.g. data mart, OLAP, URL) and has the power of delivering an enterprise-wide data storage and aggregation in a cost-effective way. This kind of system eliminates redundancy over the group of clients, delivering scalability and flexibility. Moreover, the improved RDBMS of the present invention can be used as the data store component of in any informational database system as described above, including data analysis programs such as spread-sheet modeling programs, serving the data storage and aggregation needs of such systems.

Functional Advantages Gained By The Improved RDBMS Of The Present Invention

The features of the RDBMS of the present invention, provides for dramatically improved response time in handling queries issued to the RDBMS that involve aggregation, thus enabling enterprise-wide centralized aggregation. Moreover, in the preferred embodiment of the present invention, users can query the aggregated data in an manner no different than traditional queries on an RDBMS.

The method of Segmented Aggregation employed by the novel RDBMS of the present invention provides flexibility, scalability, the capability of Query Directed Aggregation, and speed improvement.

Moreover, the method of Query Directed Aggregation (QDR) employed by the novel RDBMS of the present invention minimizes the data handling operations in multi-hierarchy data structures, eliminates the need to wait for full aggregation to be complete, and provides for build-up of aggregated data required for full aggregation.

It is understood that the System and Method of the illustrative embodiments described herein above may be modified in a variety of ways which will become readily apparent to those skilled in the art of having the benefit of the novel teachings disclosed herein. All such modifications and variations of the illustrative embodiments thereof shall be deemed to be within the scope and spirit of the present invention as defined by the claims to Invention appended hereto.

What is claimed is:

1. A relational database management system (RDBMS) comprising:
    a relational data store storing fact data;
    an aggregation module, operatively coupled to the relational data store, for aggregating the fact data and storing the resultant aggregated data in a non-relational multi-dimensional data store;
    a query servicing mechanism, operatively coupled to the aggregation module, for servicing query statements generated in response to user input, said query servicing mechanism comprising:
        a reference generating mechanism for generating a user-defined reference to aggregated fact data generated by the aggregation module; and
        a query processing mechanism for processing a given query statement, wherein, upon identifying that the given query statement is on said user-defined reference, communicates with said aggregation module over an interface therebetween to retrieve portions of aggregated fact data pointed to by said reference that are relevant to said given query statement.

2. The RDBMS of claim 1, wherein said aggregation module includes a query handling mechanism for receiving query statements, and wherein communication between said query processing mechanism and said query handling mechanism is accomplished by forwarding the given query statement to the query handling mechanism of the aggregation module.

3. The RDBMS of claim 2, wherein said query handling mechanism extracts dimensions from the received query statement and forwards the dimensions to the storage handler, and wherein the storage handler accesses locations of the non-relational multi-dimensional data store based upon the forwarded dimensions and returns the retrieved data back to the query servicing mechanism for communication to the user.

4. The RDBMS of claim 1, wherein said aggregation module includes a data loading mechanism for loading at least fact data from the relational data store, an aggregation engine for aggregating the fact data and an storage handler for storing the fact data and resultant aggregated fact data in the non-relational multi-dimensional data store.

5. The RDBMS of claim 4, wherein said aggregation module includes control logic that, upon determining that the non-relational multi-dimensional data store does not contain data required to service the given query statement, controls the data loading mechanism and aggregation engine to aggregate at least fact data required to service the given query statement and controls the aggregation module to return the aggregated data back to the query servicing mechanism for communication to the user.

6. The RDBMS of claim 1, in combination with a data analysis engine to realize an OLAP system.

7. The RDBMS of claim 6, wherein said OLAP system is a ROLAP system.

8. The RDBMS of claim 1, for use as an enterprise wide data warehouse that interfaces to a plurality of information technology systems.

9. The RDBMS of claim 1, for use as a database store in an informational database system.

10. The RDBMS of claim 9, wherein said informational database system is a spreadsheet modeling program.

11. The RDBMS of claim 1, wherein said query statements are generated by a query interface in response to communication of a natural language query communicated from a client machine.

12. The RDBMS of claim 11, wherein said client machine comprises a web-enabled browser to communicate said natural language query to the query interface.

13. The RDBMS of claim 1, wherein said interface that provides communication between said query processing mechanism and said aggregation module comprises a standard interface.

14. The RDBMS of claim 13, wherein said standard interface is selected from the group consisting of OLDB, OLE-DB, ODBC, SQL, JDBC.

15. In a relational database management system (RDBMS) comprising a relational data store storing fact data, a method for aggregating the fact data and providing query access to the aggregated data comprising the steps of:

provnding an integrated aggregation module, operatively coupled to the relational data store, for aggregating the fact data and storing the resultant aggregated data in a non-relational multi-dimensional data store;

in response to user input, generating a reference to aggregated fact data generated by the aggregation module; and processing a given query statement generated in response to user input, wherein, upon identifying that the given query statement is on said reference, communicating with said integrated aggregation module over an interface operably coupled thereto to retrieve [retrieving] from the integrated aggregation module portions of aggregated fact data pointed to by said reference that are relevant to said given query statement.

16. The method of claim 15, further comprising the step of extracting dimensions from the given query statement, accessing locations of the non-relational multi-dimensional data store based upon the extracted dimensions, and returning the retrieved data back to the user.

17. The method of claim 15, wherein said aggregation module includes a data loading mechanism for loading at least fact data from the relational data store, an aggregation engine for aggregating the fact data and an storage handler for storing the fact data and resultant aggregated fact data in the non-relational multi-dimensional data store.

18. The method of claim 17, wherein said aggregation module, upon determining that the non-relational multi-dimensional data store does not contain data required to service the given query statement, controls the data loading mechanism and aggregation engine to aggregate at least fact data required to service the given query statement and controls the aggregation module to return the aggregated data back to the user.

19. The method of claim 15, further comprising the step of performing data analysis operations on the retrieved data as part of an OLAP system.

20. The method of claim 19, RDBMS of claim 6, wherein said OLAP system is a ROLAP system.

21. The method of claim 15, wherein said RDBMS is used as an enterprise wide data warehouse that interfaces to a plurality of information technology systems.

22. The method of claim 15, wherein said RDBMS is uses as a database store in an informational database system.

23. The method of claim 22, wherein said informational database system is a spread-sheet modeling program.

24. The method of claim 15, wherein said query statements are generated by a query interface in response to communication of a natural language query communicated from a client machine.

25. The method of claim 24, wherein said client machine comprises a web-enabled browser to communicate said natural language query to the query interface.

26. The method of claim 25, wherein said interface that is operably coupled to said aggregation module comprises a standard interface.

27. The method of claim 26, wherein said standard interface is selected from the group consisting of OLDB, OLE-DB, ODBC, SQL, JDBC.

* * * * *

(12) EX PARTE REEXAMINATION CERTIFICATE (5337th)
United States Patent
Bakalash et al.

(10) Number: US 6,385,604 C1
(45) Certificate Issued: Apr. 11, 2006

(54) RELATIONAL DATABASE MANAGEMENT SYSTEM HAVING INTEGRATED NON-RELATIONAL MULTI-DIMENSIONAL DATA STORE OF AGGREGATED DATA ELEMENTS

(75) Inventors: Reuven Bakalash, Shdema (IL); Guy Shaked, Beer Sheva (IL); Joseph Caspi, Herzlyia (IL)

(73) Assignee: Hyperroll, Israel Limited, Rehovot (IL)

Reexamination Request:
No. 90/007,326, Nov. 30, 2004

Reexamination Certificate for:
Patent No.: 6,385,604
Issued: May 7, 2002
Appl. No.: 09/634,748
Filed: Aug. 9, 2000

Related U.S. Application Data

(63) Continuation-in-part of application No. 09/514,611, filed on Feb. 28, 2000, now Pat. No. 6,434,544, which is a continuation-in-part of application No. 09/368,241, filed on Aug. 4, 1999, now Pat. No. 6,408,292.

(51) Int. Cl.
*G06F 17/30* (2006.01)

(52) U.S. Cl. .............................. 707/3; 707/10; 709/217
(58) Field of Classification Search .................. 707/10, 707/1–5, 100–104; 709/217
See application file for complete search history.

(56) References Cited

U.S. PATENT DOCUMENTS

| 4,987,554 A | 1/1991 | Kaufman |
| 4,989,141 A | 1/1991 | Lyons et al. |
| 5,101,475 A | 3/1992 | Kaufman et al. |
| 5,189,608 A | 2/1993 | Lyons et al. |
| 5,257,365 A | 10/1993 | Powers et al. |
| 5,278,966 A | 1/1994 | Parks et al. |
| 5,359,724 A | 10/1994 | Earle |
| 5,361,385 A | 11/1994 | Bakalash |
| 5,379,419 A | 1/1995 | Heffernan et al. |
| 5,706,495 A | 1/1998 | Chadha et al. |
| 5,745,764 A | 4/1998 | Leach et al. |
| 5,765,028 A | 6/1998 | Gladden |
| 5,781,896 A | 7/1998 | Dalal |
| 5,794,228 A | 8/1998 | French et al. |
| 5,794,229 A | 8/1998 | French et al. |

(Continued)

FOREIGN PATENT DOCUMENTS

| WO | WO 98/49636 A1 | 11/1998 |

OTHER PUBLICATIONS

U.S. Appl. No. 10/314,868, filed on Dec. 9, 2002.
U.S. Appl. No. 10/314,872, filed on Dec. 9, 2002.
U.S. Appl. No. 10/314,884, filed on Dec. 9, 2002.
U.S. Appl. No. 10/314,902, filed on Dec. 9, 2002.
U.S. Appl. No. 10/314,904, filed on Dec. 9, 2002.
U.S. Appl. No. 10/818,697, filed on Apr. 6, 2004.
U.S. Appl. No. 10/832,104, filed on Apr. 26, 2004.
U.S. Appl. No. 10/839,782, filed on May 5, 2004.
U.S. Appl. No. 10/839,790, filed on May 5, 2004.
U.S. Appl. No. 10/842,648, filed on May 10, 2004.

(Continued)

*Primary Examiner*—Safet Metjahic

(57) ABSTRACT

Improved method of and apparatus for joining and aggregating data elements integrated within a relational database management system (RDBMS) using a non-relational multi-dimensional data structure (MDD). The improved RDBMS system of the present invention can be used to realize achieving a significant increase in system performance (e.g. [deceased] decreased access/search time), user flexibility and ease of use. The improved RDBMS system of the present invention can be used to realize an improved Data Warehouse for supporting on-line analytical processing (OLAP) operations or to realize an improved informational database system or the like.

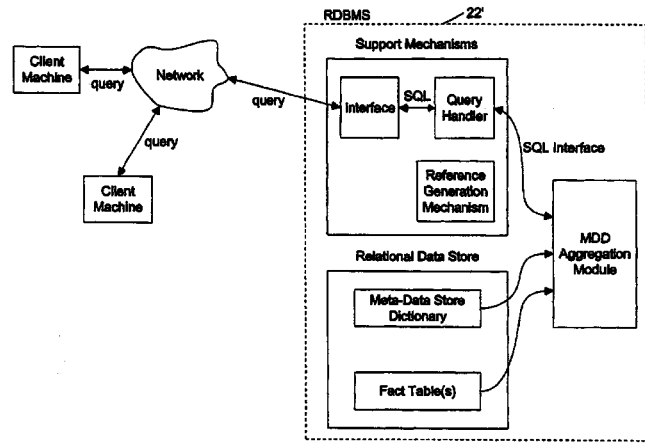

U.S. PATENT DOCUMENTS

| | | | |
|---|---|---|---|
| 5,794,246 | A | 8/1998 | Sankaran et al. |
| 5,799,300 | A | 8/1998 | Agrawal et al. |
| 5,805,885 | A | 9/1998 | Leach et al. |
| 5,822,751 | A | 10/1998 | Gray et al. |
| 5,832,475 | A | 11/1998 | Agrawal et al. |
| 5,850,547 | A | 12/1998 | Waddington et al. |
| 5,852,821 | A | 12/1998 | Chen et al. |
| 5,857,184 | A | 1/1999 | Lynch |
| 5,864,857 | A | 1/1999 | Ohata et al. |
| 5,890,151 | A | 3/1999 | Agrawal et al. |
| 5,901,287 | A | 5/1999 | Bull |
| 5,905,985 | A | 5/1999 | Malloy et al. |
| 5,915,257 | A | 6/1999 | Gartung et al. |
| 5,918,225 | A | 6/1999 | White et al. |
| 5,918,232 | A * | 6/1999 | Pouschine et al. ...... 707/103 R |
| 5,926,818 | A | 7/1999 | Malloy |
| 5,926,820 | A | 7/1999 | Agrawal et al. |
| 5,940,822 | A | 8/1999 | Haderle et al. |
| 5,963,936 | A | 10/1999 | Cochrane et al. |
| 5,978,788 | A | 11/1999 | Castelli et al. |
| 5,978,796 | A | 11/1999 | Malloy et al. |
| 5,987,467 | A | 11/1999 | Ross et al. |
| 5,991,754 | A | 11/1999 | Raitto et al. |
| 5,999,192 | A | 12/1999 | Selfridge et al. |
| 6,003,029 | A | 12/1999 | Agrawal et al. |
| 6,006,216 | A | 12/1999 | Griffin et al. |
| 6,023,695 | A | 2/2000 | Osborn et al. |
| 6,034,697 | A | 3/2000 | Becker |
| 6,064,999 | A | 5/2000 | Dalal |
| 6,108,647 | A | 8/2000 | Poosala et al. |
| 6,115,705 | A | 9/2000 | Larson |
| 6,122,628 | A | 9/2000 | Castelli et al. |
| 6,134,541 | A | 10/2000 | Castelli et al. |
| 6,141,655 | A | 10/2000 | Johnson et al. |
| 6,151,601 | A | 11/2000 | Papierniak et al. |
| 6,161,103 | A | 12/2000 | Rauer et al. |
| 6,163,774 | A | 12/2000 | Lore et al. |
| 6,173,310 | B1 | 1/2001 | Yost et al. |
| 6,182,060 | B1 | 1/2001 | Hedgcock et al. |
| 6,182,061 | B1 | 1/2001 | Matsuzawa et al. |
| 6,189,004 | B1 | 2/2001 | Rassen et al. |
| 6,205,447 | B1 * | 3/2001 | Malloy ...................... 707/102 |
| 6,208,975 | B1 | 3/2001 | Bull et al. |
| 6,209,036 | B1 | 3/2001 | Aldred et al. |
| 6,212,515 | B1 | 4/2001 | Rogers |
| 6,212,524 | B1 | 4/2001 | Weissman et al. |
| 6,212,617 | B1 | 4/2001 | Hardwick |
| 6,249,791 | B1 | 6/2001 | Osborn et al. |
| 6,269,393 | B1 | 7/2001 | Yost et al. |
| 6,317,750 | B1 | 11/2001 | Tortolani et al. |
| 6,321,241 | B1 | 11/2001 | Gartung et al. |
| 6,324,533 | B1 | 11/2001 | Agrawal et al. |
| 6,330,564 | B1 | 12/2001 | Hellerstein et al. |
| 6,374,234 | B1 | 4/2002 | Netz |
| 6,385,301 | B1 | 5/2002 | Nolting et al. |
| 6,397,195 | B1 | 5/2002 | Pinard et al. |
| 6,405,208 | B1 | 6/2002 | Raghavan et al. |
| 6,408,292 | B1 | 6/2002 | Bakalash et al. |
| 6,434,544 | B1 | 8/2002 | Bakalash et al. |
| 6,473,764 | B1 | 10/2002 | Petculescu et al. |
| 6,477,536 | B1 * | 11/2002 | Pasumansky et al. ....... 707/102 |
| 6,484,179 | B1 * | 11/2002 | Roccaforte .................. 707/102 |
| 6,493,728 | B1 * | 12/2002 | Berger ........................ 707/202 |
| 6,535,872 | B1 * | 3/2003 | Castelli et al. ................. 707/3 |
| 6,549,907 | B1 | 4/2003 | Fayyad et al. |
| 6,587,547 | B1 | 7/2003 | Zirngibl et al. |
| 6,594,672 | B1 | 7/2003 | Lampson et al. |
| 6,601,062 | B1 | 7/2003 | Deshpande |
| 6,629,094 | B1 | 9/2003 | Colby |
| 6,643,661 | B1 | 11/2003 | Polizzi et al. |
| 6,662,174 | B1 | 12/2003 | Shah et al. |
| 6,732,115 | B1 | 5/2004 | Shah et al. |
| 6,748,394 | B1 | 6/2004 | Shah et al. |
| 6,763,357 | B1 * | 7/2004 | Deshpande et al. ......... 707/101 |
| 6,766,325 | B1 * | 7/2004 | Pasumansky et al. ....... 707/101 |
| 6,832,263 | B1 | 12/2004 | Polizzi et al. |
| 2002/0016924 | A1 | 2/2002 | Shah et al. |
| 2002/0023122 | A1 | 2/2002 | Polizzi et al. |
| 2002/0029207 | A1 | 3/2002 | Bakalash et al. |
| 2002/0038229 | A1 | 3/2002 | Shah et al. |
| 2002/0038297 | A1 | 3/2002 | Shah et al. |
| 2002/0099692 | A1 | 7/2002 | Shah et al. |

OTHER PUBLICATIONS

U.S. Appl. No. 10/849,501, filed on May 19, 2004.

U.S. Appl. No. 10/988,221, filed on Nov. 12, 2004.

Li, C. et al., "A Data Model for Supporting On–Line Analytical Processing," Presented at the International Conference on Information and Knowledge Management, 1996, pp. 81–88.

Albrecht, J. et al., "Aggregate–Based Query Processing in a Parallel Data Warehouse Server," Proceedings of the Tenth International Workshop on Database and Expert Systems Applications, Sep. 1–3, 1999, pp. 40–44.

Pourabbas, E. et al., "Characterization of Hierarchies and Some Operators in OLAP Environment," Presented at the ACM $2^{nd}$ International Workshop on Data Warehousing and OLAP, Nov. 2–6, 1999, pp. 1–17.

Widmann, N. et al., "Efficient Execution of Operations in a DBMS for Multidimensional Arrays," Presented at the ACM SIGMOD 1998, pp. 1–11, http://dblp.uni–trier.de/db/conf/ssdbm/WidmannB98.html.

Korn, F. et al., "Efficiently Supporting Ad Hoc Queries in Large Datasets of Time Sequences," Presented at ACM SIGMOD International Conference on Management of Data, May 11–15, 1997, pp. 1–22, http://www.acm.org/pubs/citations/proceedings/mod/253260.p289–kom/.

Pedersen, T.B., Aspects of Data Modeling and Query Processing for Complex Multidimensional Data, 2000, pp. 1–180, Danish Academy of Technical Sciences.

Pourabbas, E. et al., "Hierarchies and Relative Operators in the OLAP Environment," SIGMOD Record, Mar. 2000, pp. 1–8, vol. 29, No. 1, http://dblp.uni.trier.de/db/journals/sigmod/sigmod29.html.

Salem, K. et al., "How to Roll a Join: Asynchronous Incremental View Maintenance," Presented at ACM Sigmod on Management of Data and Symposium on Principles of Database Systems, May 15–18, 2000, pp. 1–13, http://www.acm.org/pubs/citations/proceedings/mod/342009/p129–salem/#abstract.

Harinarayan, V. et al., "Implementing Data Cubes Efficiently," Presented at the ACM SIGMOD International Conference on Management of Data, Jun. 4–6, 1996, pp. 205–216.

Agrawal, R. et al., "Modeling Multidimensional Databases," IBM Almaden Research Center, 1995; Presented at the $13^{th}$ International Conference on Data Engineering Apr. 1997, pp. 1–23.

Agarwal, S. et al., "On the Computation of Multidimensional Aggregates," Presented at the $22^{nd}$ VLDB Conference, 1996, pp. 1–16.

Hellerstein, J.M. et al., "Online Aggregation," Presented at the ACM SIGMOD International Conference on Management of Data, May 1997, Tucson, Arizona, pp. 1–12, http://www.acm.org/pubs/citations/proceedings/mod/253260/p171–hellerstein/.

Elkins, S.B., "Open OLAP," DBMS, Apr. 1998, pp. 1–7, http://www.dbmsmag.com/9804d14.html.

Li, C. et al., "Optimizing Statistical Queries by Exploiting Orthogonality and Interval Properties of Grouping Relations," Presented at the 8$^{th}$ International Conference on Scientific & Statistical Database Management, pp. 1–10, Jun. 1996.

Ho, C. et al., "Range Queries in OLAP Data Cubes,"Presented at the ACM SIGMOD International Conference on Management of Data, May 11–15, 1997, pp. 1–16, http://www.acm.org/pubs/citations/proceedings/mod/253260/p73–ho/.

"See Data from All Angles with Multidimensional Database Software" SAS Institute Inc., 2001, 1 page, www.sas.com/products/mddb/index.html.

Cheung, D.W. et al., "Towards the Building of a Dense–Region–Based OLAP System," Data and Knowledge Engineering, 2001, pp. 1–27, vol. 36, No. 1, http://www.elsevier.nl/gej–ng/10/16/74/62/24/24/abstract.html.

McKie, S., "Essbase 4.0," DBMS Online, Jul. 1996, pp. 1–4, http://www.dbmsmag.com/9607d13.html.

Hellerstein, J.M., "Optimization Techniques for Queries with Expensive Methods," ACM Transactions on Database Systems (TODS), 1998, pp. 113–157, vol. 23, No. 2.

Colliat, G., "OLAP, Relational, and Multidimensional Database Systems," SIGMOD Record, Sep. 1996, pp. 64–69, vol. 25, No. 3.

Kimball, R., "The Aggregate Navigator; How to Optimize Your Data Warehouse Using Aggregates Without Driving Your End Users Crazy," DBMS, Nov. 1995, www.dbmsmag.com.

Pendse, N., "The Origins of Today's OLAP Products," Feb. 6, 2003, pp. 1–7, http://www.olapreport.com/origins.htm.

"Introduction To Structured Query Language," 2000, pp. 1–33, http:/w3.one.net/~about.jhoffmann/sqltut.htm.

Date, C.J., "An Introduction to Database Systems," 2000, pp. 250, 266, 289–326, Addison–Wesley, Seventh Edition.

"The Art of Indexing," A White Paper by DISC, Oct. 1999, pp. 3–30, Dynamic Information Systems Corporation.

Harrington, J.L., "Relational Database Design Clearly Explained," 1998, pp. v–xiii, 1–62, Morgan Kaufman.

Kimball, R., "Aggregate Navigation With (Almost) No MetaData," 1996, pp. 1–8, http://www.dbmsmag.com/9608d54.html.

Duhl, J. et al., "A Performance Comparison of Object and Relational Databases Using the Sun Benchmark," Proceedings of the Conference on Object Oriented Programming Systems Languages and Applications, Sep. 25–30, 1988, pp. 153–163.

Gupta, H. V., et al., "Index Selection for OLAP", Proceedings of the 13th Int'l Conference on Data Engineering, Apr. 7–11, 1997, pp. 208–219.

Chaudhuri, S. et al., "An Overview of Data Warehousing and OLAP Technology", SIGMOD Record, New York, NY Mar. 1997, vol. 26, No. 1.

Colby, L.S. et al. "Red Brick Vista: Aggregate Computation and Myanagement", Data Engineering 1998 Proceedings, 14th Int'l Conference in Orlando, Fl., Feb. 23–27, 1998.

Albrecht, J. et al. "Management of Multidimensional Aggregates for Efficient Online Analytical Processing," Database Engineering and Applications, 1999, Int'l Symposium Proceedings Montreal, Quebec, Canada.

Zhao, Y et al., "Array–Based Evaluation of Multi–Dimensional Queries in Object–Relational Database Systems," Data Engineering, 1998 Proceedings, 14th Int'l Conference in Orlando, Fl., Feb. 23–27, 1998.

"Performance Management—Product Information," ENT, Jul. 17, 1999, 2 pages.

"Checking Out OLAP Architectures; Technology Information", Robert Craig, *ENT*, Aug. 20, 1997, No. 12, vol. 2; p. 40.

* cited by examiner

US 6,385,604 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–19, 21 and 24–27 is confirmed.

Claims 20 and 22 are determined to be patentable as amended.

Claim 23, dependent on an amended claim, is determined to be patentable.

New claims 28–123 are added and determined to be patentable.

20. The method of claim 19, [RDBMS of claim 6,] wherein said OLAP system is a ROLAP system.

22. The method of claim 15, wherein said RDBMS is [uses] *used* as a database store in an informational database system.

28. *The RDBMS of claim 1, wherein communication over said interface between said query processing mechanism and said aggregation module occurs over a relational database management system interface in which a link is formed by representing non-relational multi-dimensional data as a relational table.*

29. *The RDBMS of claim 28, wherein said interface is an SQL interface.*

30. *The RDBMS of claim 29 wherein an SQL view mechanism enables said representing non-relational multi-dimensional data as a relational table.*

31. *The RDBMS of claim 1, wherein said reference generating mechanism is further for defining a link over said interface between the query processing mechanism and said aggregation module.*

32. *The RDBMS of claim 31, wherein said reference generating mechanism defines said link using a view mechanism.*

33. *The RDBMS of claim 32, wherein said view mechanism is a Create View SQL statement.*

34. *The RDBMS of claim 31, wherein said reference generating mechanism defines said link using a direct mechanism.*

35. *The RDBMS of claim 34, wherein said direct mechanism is a NA trigger mechanism.*

36. *The RDBMS of claim 1, wherein said user-defined reference defines a table name (TN) associated with said non-relational multi-dimensional data store.*

37. *The RDBMS of claim 36, wherein said TN is a remote table name.*

38. *The RDBMS of claim 36, wherein said TN is a native table name.*

39. *The RDBMS of claim 36, wherein said query processing mechanism forwards any query statement on said TN to said aggregation module.*

40. *The RDBMS of claim 31, wherein said query processing mechanism routes a given query statement using the link.*

41. *The RDBMS of claim 1, wherein said query processing mechanism, upon identifying that the given query statement is not on said user-defined reference, directs the given query statement to the relational data store.*

42. *The RDBMS of claim 1, said query processing mechanism including a query interface for receiving a first type of query directed to querying relational data stored in said relational data store and a second type of query directed to querying data aggregated by said aggregation module.*

43. *The RDBMS of claim 1, wherein said aggregation module in response to determining that the non-relational multi-dimensional data store does not contain data required to service the given query statement, aggregates at least data required to service the given query statement.*

44. *The RDBMS of claim 1, wherein said interface is a first interface and wherein said aggregation module is operatively coupled to said relational data store through a second interface.*

45. *The RDBMS of claim 1, wherein said user-defined reference defines a reference for an SQL interface to access non-relational data in said non-relational multi-dimensional data store.*

46. *The RDBMS of claim 1 wherein said interface is an SQL interface and said user-defined reference is operative to represent said non-relational multi-dimensional data store as a relational table for the purpose of accessing said non-relational multi-dimensional data store via said SQL interface.*

47. *The method of claim 15, further comprising representing non-relational multi-dimensional data as a relational table to form a link over said interface between said RDBMS and said aggregation module.*

48. *The method of claim 47, wherein said interface is an SQL interface.*

49. *The method of claim 47 wherein said representing non-relational multi-dimensional data is performed using an SQL view mechanism.*

50. *The method of claim 15, wherein said reference defines a link over said interface for accessing said aggregated fact data generated by said aggregation module.*

51. *The method of claim 50, further comprising establishing an SQL view for defining said link.*

52. *The method of claim 51, wherein said establishing an SQL view comprises using a Create View SQL statement.*

53. *The method of claim 50, wherein said reference defines said link using a direct mechanism.*

54. *The method of claim 53, wherein said direct mechanism is a NA trigger mechanism.*

55. *The method of claim 15, wherein said reference uses a table name (TN) associated with said non-relational multi-dimensional data store.*

56. *The method of claim 55, wherein said TN is a remote table name.*

57. *The method of claim 55, wherein said TN is a native table name.*

58. *The method of claim 55, further comprising forwarding any query statement on said TN to said aggregation module.*

59. *The method of claim 50, further comprising routing the given query statement using the link.*

60. *The method of claim 15, further comprising in response to identifying that the given query statement is not on said reference, directing the given query statement to the relational data store.*

61. *The method of claim 15, further comprising receiving a first type of query directed to querying relational data* stored in said relational data store and a second type of query directed to querying data aggregated by said aggregation module.

62. The method of claim 15, further comprising in response to determining that the non-relational multi-dimensional data store does not contain data required to service the given query statement, aggregating at least data required to service the given query statement.

63. The method of claim 15, wherein said interface is a first interface and wherein said aggregation module is operatively coupled to said relational data store through a second interface.

64. The method of claim 15, wherein said reference defines an SQL reference to access data in said non-relational multi-dimensional data store.

65. The method of claim 15 wherein said interface is an SQL interface and said reference is operative to represent said non-relational multi-dimensional data store as a relational table for the purpose of accessing said non-relational multi-dimensional data store via said SQL interface.

66. The RDBMS of claim 1, wherein said aggregation module is configured to dynamically select a rollup order to service a given query statement wherein in response to determining that the data required to service the given query statement is not pre-calculated, said aggregation module directs the rollup order to aggregate data required to service the given query statement, said aggregation module in response to determining that the previously aggregated data may be used as a basis for aggregating data along one or more dimensions to service the given query statement directing the rollup order to aggregate data based on said previously aggregated data.

67. The RDBMS of claim 66, wherein said aggregation module is configured to permit querying at any stage of aggregation, eliminating the need to wait for a full aggregation to be completed before servicing a given query statement can begin.

68. The RDBMS of claim 67, wherein aggregated data generated to service a given query statement is stored in said non-relational multi-dimensional data store to build up a store of aggregated data to service further query statements.

69. The RDBMS of claim 66, wherein said aggregation module divides multidimensional space into independent segments that may be rolled up in different sequences.

70. The RDBMS of claim 66, wherein said aggregation module is configured to analyze hierarchies of fact data and organize data to limit storage access of base data to a single instance to reduce storage requirements for sparse data.

71. The RDBMS of claim 69, wherein said aggregation module generates an index for retrieval of each of said independent segments.

72. The RDBMS of claim 1, wherein said aggregation module segments multi-dimensional space in said non-relational multi-dimensional data store into independent segments that may be processed in different sequences such that a rollup sequence may be statically or dynamically selected.

73. The RDBMS of claim 72, wherein said aggregation module has a query directed rollup mode of operation for servicing a given query statement using partially pre-aggregated data in which in response to determining that the data required to service the given query statement has not been pre-aggregated, said aggregation module directs the rollup order to aggregate data required to service the given query statement using as a basis data stored in said non-relational multi-dimensional data store.

74. The RDBMS of claim 73, wherein aggregated data generated to service the given query statement is stored in said non-relational multi-dimensional data store to build up the store of aggregated data to service further query statements.

75. The RDBMS of claim 72, wherein said aggregation module is configured to dynamically select a rollup order at query time wherein in response to determining that the data required to service the given query statement is not pre-calculated, said aggregation module directs the rollup order to aggregate data required to service the given query statement, said aggregation module in response to determining that previously aggregated data may be used as a basis for aggregating data along one or more dimensions to service the given query statement directs the rollup order to aggregate data based on said previously aggregated data.

76. The RDBMS of claim 72, wherein said aggregation module includes an aggregation engine that has a mode of operation in which data is aggregated on the fly utilizing pre-aggregated data as a basis for aggregation along one or more dimensions.

77. The RDBMS of claim 1, wherein said aggregation module divides multidimensional space into independent multidimensional cubes, wherein each independent multidimensional cube corresponds to a portion of said non-relational multidimensional data store that may be processed independently.

78. The RDBMS of claim 77, wherein said aggregation module has a mode for servicing query statements based on partially pre-aggregated data in which at query time said aggregation module utilizes pre-aggregated data associated with one or more of said independent multidimensional cubes as a basis for performing aggregations to service query statements.

79. The RDBMS of claim 78, wherein said aggregation module selects a rollup order in which the rollup order is dynamically selected based upon which of said independent multidimensional cubes has been pre-aggregated and is capable of being used as a basis for further aggregation to service query statements.

80. The RDBMS of claim 1, wherein said aggregation module includes an aggregation engine, said aggregation engine having a mode of operation for partially pre-aggregated data in which in response to determining that said non-relational multidimensional data store does not contain data required to service the given query statement said aggregation module dynamically aggregates data to service the given query statement using partially pre-aggregated data as a basis for aggregation.

81. The RDBMS of claim 1, in combination with a data analysis engine to realize an OLAP system supporting OLAP operations, said aggregation module upon determining that the non-relational multi-dimensional data store does not contain data required to service the given query statement dynamically aggregates data required to service the given query statement.

82. The RDBMS of claim 66, in combination with a data analysis engine to realize an OLAP system.

83. The RDBMS of claim 72, in combination with a data analysis engine to realize an OLAP system.

84. The RDBMS of claim 77, in combination with a data analysis engine to realize an OLAP system.

85. The RDBMS of claim 80, in combination with a data analysis engine to realize an OLAP system.

86. The method of claim 15, further comprising dynamically selecting a rollup order to service query statements wherein in response to determining that the data required to service the given query statement is not pre-calculated, said aggregation module directs the rollup order to aggregate data required to service the given query statement, said aggregation module in response to determining the previously aggregated data may be used as a basis for aggregating data along one or more dimensions to service the given query statement directs the rollup order to aggregate data based on said previously aggregated data.

87. The method of claim 86, wherein servicing the given query statement is permitted at any stage of aggregation, eliminating the need to wait for a full aggregation to be completed before servicing the given query statement can begin.

88. The method of claim 87, further comprising storing aggregated data generated to service the given query statement to build up a store of aggregated data to service further query statements.

89. The method of claim 87, further comprising dividing multidimensional space into independent segments that may be rolled up in different sequences.

90. The method of claim 89, further comprising analyzing hierarchies of data and organizing data to eliminate redundant storage of sparse data.

91. The method of claim 89, further comprising indexing each of said independent segments for data retrieval.

92. The method of claim 15, further comprising segmenting multi-dimensional space in said non-relational multidimensional data store into independent segments that may be processed in different sequences such that a rollup sequence may be statically or dynamically selected.

93. The method of claim 92, further comprising performing a query directed rollup in response to determining that the data required to service the given query statement has not been pre-aggregated, wherein the rollup order is selected to aggregate data required to service the given query statement using as a basis data stored in said non-relational multi-dimensional data store.

94. The method of claim 93, further comprising storing aggregated data generated to service the given query statement to build up the store of aggregated data to service further query statements.

95. The method of claim 92, further comprising dynamically selecting a rollup order at query time wherein in response to determining that the data required to service the given query statement is not pre-calculated, the rollup order is selected to aggregate data required to service the given query statement and in response to determining that previously aggregated data may be used as a basis for aggregating data along one or more dimensions to service the given query statement directing the rollup order to aggregate data based on said previously aggregated data.

96. The method of claim 91, wherein said aggregation module includes an aggregation engine, the method further comprising directing said aggregation engine to aggregate data to service the given query statement based upon any pre-aggregated data contained in said non-relational multi-dimensional data store that may be used as a basis for aggregation along one or more dimensions.

97. The method of claim 15, further comprising dividing multidimensional space into independent multidimensional cubes, wherein each independent multidimensional cube corresponds to a portion of said non-relational multidimensional data store that may be processed independently.

98. The method of claim 97, further comprising servicing query statements based on partially pre-aggregated data in which at query time said aggregation module utilizes pre-aggregated data associated with one or more of said independent multidimensional cubes as a basis for performing aggregations to service query statements.

99. The method of claim 98, further comprising selecting a rollup order in which the rollup order is dynamically selected based upon which of said independent multidimensional cubes has been pre-aggregated and are capable of being used as a basis for further aggregation to service query statements.

100. The method of claim 15, wherein said aggregation module includes an aggregation engine, said aggregation engine having a mode of operation for partially pre-aggregated data in which in response to determining that said non-relational multidimensional data store does not contain data required to service the given query statement said aggregation module dynamically aggregates data to service the given query statement using partially pre-aggregated data as a basis for aggregation.

101. The method of claim 15, further comprising:
performing data analysis operations on the retrieved data as part of an OLAP system; and
in response to determining that the non-relational multidimensional data store does not contain data required to service the given query statement, dynamically aggregating data required to service the given query statement.

102. The method of claim 86, further comprising performing data analysis operations on the retrieved data as part of an OLAP system.

103. The method of claim 92, further comprising performing data analysis operations on the retrieved data as part of an OLAP system.

104. The method of claim 97, further comprising performing data analysis operations on the retrieved data as part of an OLAP system.

105. The method of claim 100, further comprising performing data analysis operations on the retrieved data as part of an OLAP system.

106. The RDBMS of claim 1, wherein said aggregation module and said non-relational multi-dimensional data store are part of an aggregation server that is separate from said relational data store.

107. The RDBMS of claim 66, wherein said aggregation module and said non-relational multi-dimensional data store are part of an aggregation server that is separate from said relational data store.

108. The RDBMS of claim 72, wherein said aggregation module and said non-relational multi-dimensional data store are part of an aggregation server that is separate from said relational data store.

109. The RDBMS of claim 77, wherein said aggregation module and said non-relational multi-dimensional data store are part of an aggregation server that is separate from said relational data store.

110. The RDBMS of claim 80, wherein said aggregation module and said non-relational multi-dimensional data store are part of an aggregation server that is separate from said relational data store.

111. The RDBMS of claim 81, wherein said aggregation module and said non-relational multi-dimensional data store are part of an aggregation server that is separate from said relational data store.

112. The RDBMS of claim 1, wherein said non-relational multi-dimensional data store is a separate data store from said relational data store.

113. The RDBMS of claim 66, wherein said non-relational multi-dimensional data store is a separate data store from said relational data store.

114. The RDBMS of claim 72, wherein said non-relational multi-dimensional data store is a separate data store from said relational data store.

115. The RDBMS of claim 77, wherein said non-relational multi-dimensional data store is a separate data store from said relational data store.

116. The RDBMS of claim 80, wherein said non-relational multi-dimensional data store is a separate data store from said relational data store.

117. The RDBMS of claim 81, wherein said non-relational multi-dimensional data store is a separate data store from said relational data store.

118. The RDBMS of claim 1, wherein said aggregation module maps data received from the relational data store into the data types used by the aggregation module.

119. The RDBMS of claim 1, wherein said aggregation module supports a plurality of data types.

120. The RDBMS of claim 1, wherein said user-defined reference enables servicing query statements using aggregated fact data generated by the aggregation module.

121. The RDBMS of claim 1, wherein said user-defined reference enables servicing querying statements using aggregated fact data stored in the non-relational multi-dimensional data store.

122. The RDBMS of claim 121, wherein said aggregation module supports plurality of data types.

123. The RDBMS of claim 1, wherein said user-defined reference enables servicing query statements using aggregated fact data generated by the aggregation module and stored in the non-relational multi-dimensional data store.

* * * * *